(12) United States Patent
Walker et al.

(10) Patent No.: US 8,756,644 B2
(45) Date of Patent: *Jun. 17, 2014

(54) SYSTEM AND METHOD FOR SUPPLYING SUPPLEMENTAL AUDIO INFORMATION FOR BROADCAST TELEVISION PROGRAMS

(71) Applicant: Walker Digital, LLC, Stamford, CT (US)

(72) Inventors: Jay S. Walker, Ridgefield, CT (US);
James A. Jorasch, New York, NY (US);
Thomas M. Sparico, Hoboken, NJ (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,225

(22) Filed: Feb. 6, 2013

(65) Prior Publication Data
US 2013/0152144 A1 Jun. 13, 2013

Related U.S. Application Data

(63) Continuation of application No. 12/272,190, filed on Nov. 17, 2008, now Pat. No. 8,402,500, which is a continuation of application No. 09/660,579, filed on Sep. 12, 2000, now Pat. No. 7,454,776, which is a continuation of application No. 08/821,436, filed on Mar. 21, 1997, now Pat. No. 6,209,028.

(51) Int. Cl.
*H04N 7/173* (2011.01)

(52) U.S. Cl.
USPC ............ 725/122; 725/115; 725/118; 348/485

(58) Field of Classification Search
USPC .......... 725/135, 138, 141, 144, 153; 348/552, 348/476–485; 379/88.05, 88.06; 709/217–219
See application file for complete search history.

(56) References Cited

U.S. PATENT DOCUMENTS

| | | | |
|---|---|---|---|
| 4,272,327 | A | 6/1981 | Logan |
| 4,349,701 | A | 9/1982 | Snopko |
| 4,352,012 | A | 9/1982 | Verderber et al. |

(Continued)

FOREIGN PATENT DOCUMENTS

| | | |
|---|---|---|
| AT | 422133 | 2/2009 |
| AU | 6467398 | 10/1998 |

(Continued)

OTHER PUBLICATIONS

Anastassiou, Digital Television, *Proceedings of the IEEE*, vol. 82, No. 4, Apr. 1, 1994, pp. 510-519.

(Continued)

*Primary Examiner* — Ngoc Vu
(74) *Attorney, Agent, or Firm* — Fincham Downs, LLC; Carson C. K. Fincham

(57) ABSTRACT

A method, computer readable medium and an apparatus for providing supplemental information related to a character featured on a broadcast television program, wherein the supplemental information is not broadcast along with the broadcast television program. A viewer can request specific supplemental information associated with the broadcast television program through a telephone or electronic network interface. In some embodiments, a service controller transmits the requested supplemental information such that an audio component of the supplemental information does not conflict with the audio component of the broadcast television program.

30 Claims, 12 Drawing Sheets

(56) References Cited

U.S. PATENT DOCUMENTS

| | | | |
|---|---|---|---|
| 4,389,679 A | 6/1983 | Missan et al. | |
| 4,398,216 A | 8/1983 | Field et al. | |
| 4,410,911 A | 10/1983 | Field et al. | |
| 4,532,554 A | 7/1985 | Skala | |
| 4,549,750 A | 10/1985 | Stone et al. | |
| 4,592,546 A | 6/1986 | Fascenda et al. | |
| 4,622,592 A | 11/1986 | Ikehata et al. | |
| 4,654,728 A | 3/1987 | Lunsford | |
| 4,673,266 A | 6/1987 | Fiumi | |
| 4,686,704 A | 8/1987 | Kamada et al. | |
| 4,734,764 A | 3/1988 | Pocock et al. | |
| 4,838,275 A | 6/1989 | Lee | |
| 4,839,733 A | 6/1989 | Karamon et al. | |
| 4,847,698 A | 7/1989 | Freeman | |
| 4,847,699 A | 7/1989 | Freeman | |
| 4,847,700 A | 7/1989 | Freeman | |
| 4,918,516 A | 4/1990 | Freeman | |
| 4,931,950 A | 6/1990 | Isle et al. | |
| 4,937,807 A | 6/1990 | Weitz et al. | |
| 4,941,170 A | 7/1990 | Herbst | |
| 4,969,136 A | 11/1990 | Chamberlin et al. | |
| 5,001,572 A | 3/1991 | Hashimoto et al. | |
| 5,014,125 A | 5/1991 | Pocock et al. | |
| 5,055,939 A | 10/1991 | Karamon et al. | |
| 5,083,816 A | 1/1992 | Folga et al. | |
| 5,097,418 A | 3/1992 | Nurse et al. | |
| 5,111,409 A | 5/1992 | Gasper et al. | |
| 5,115,326 A | 5/1992 | Burgess et al. | |
| 5,189,630 A | 2/1993 | Barstow et al. | |
| 5,220,420 A | 6/1993 | Hoarty et al. | |
| 5,231,493 A | 7/1993 | Apitz | |
| 5,241,671 A | 8/1993 | Reed et al. | |
| 5,249,827 A | 10/1993 | Olson | |
| 5,251,015 A | 10/1993 | Rumreich | |
| 5,265,065 A | 11/1993 | Turtle | |
| 5,280,572 A | 1/1994 | Case et al. | |
| 5,299,134 A | 3/1994 | Speckhart et al. | |
| 5,307,456 A | 4/1994 | MacKay | |
| 5,343,300 A | 8/1994 | Hennig | |
| 5,345,549 A | 9/1994 | Appel et al. | |
| 5,345,551 A | 9/1994 | Shelley et al. | |
| 5,347,632 A | 9/1994 | Filepp et al. | |
| 5,353,391 A | 10/1994 | Cohen et al. | |
| 5,367,621 A | 11/1994 | Cohen et al. | |
| 5,388,993 A | 2/1995 | McKiel et al. | |
| 5,393,073 A | 2/1995 | Best | |
| 5,404,316 A | 4/1995 | Klingler et al. | |
| 5,410,343 A | 4/1995 | Coddington et al. | |
| 5,414,808 A | 5/1995 | Williams | |
| 5,438,355 A * | 8/1995 | Palmer | 725/110 |
| 5,440,678 A | 8/1995 | Eisen et al. | |
| 5,455,409 A | 10/1995 | Smith et al. | |
| 5,481,542 A | 1/1996 | Logston et al. | |
| 5,483,651 A | 1/1996 | Adams et al. | |
| 5,485,221 A | 1/1996 | Banker et al. | |
| 5,495,283 A | 2/1996 | Cowe | |
| 5,496,071 A | 3/1996 | Walsh | |
| 5,497,241 A | 3/1996 | Ostrover et al. | |
| 5,502,637 A | 3/1996 | Beaulieu et al. | |
| 5,506,984 A | 4/1996 | Miller | |
| 5,509,060 A | 4/1996 | Hall et al. | |
| 5,513,384 A | 4/1996 | Brennan et al. | |
| 5,521,364 A | 5/1996 | Kimura et al. | |
| 5,521,815 A | 5/1996 | Rose, Jr. | |
| 5,523,796 A | 6/1996 | Marshall et al. | |
| 5,523,945 A | 6/1996 | Satoh et al. | |
| 5,526,257 A | 6/1996 | Lerner | |
| 5,530,852 A | 6/1996 | Meske, Jr. et al. | |
| 5,541,662 A | 7/1996 | Adams et al. | |
| 5,544,649 A | 8/1996 | David et al. | |
| 5,550,578 A | 8/1996 | Hoarty et al. | |
| 5,553,609 A | 9/1996 | Chen et al. | |
| 5,559,949 A | 9/1996 | Renier et al. | |
| 5,561,709 A | 10/1996 | Remillard | |
| 5,570,295 A | 10/1996 | Isenberg et al. | |
| 5,576,843 A | 11/1996 | Cookson et al. | |
| 5,583,560 A * | 12/1996 | Florin et al. | 725/40 |
| 5,585,838 A | 12/1996 | Lawler et al. | |
| 5,585,858 A | 12/1996 | Harper et al. | |
| 5,586,121 A | 12/1996 | Moura et al. | |
| 5,589,872 A | 12/1996 | Martinez | |
| 5,589,892 A | 12/1996 | Knee et al. | |
| 5,594,509 A | 1/1997 | Florin et al. | |
| 5,594,660 A | 1/1997 | Sung et al. | |
| 5,596,419 A | 1/1997 | Yoshimura et al. | |
| 5,596,705 A | 1/1997 | Reimer et al. | |
| 5,600,364 A | 2/1997 | Hendricks et al. | |
| 5,612,730 A | 3/1997 | Lewis | |
| 5,617,565 A | 4/1997 | Augenbraun et al. | |
| 5,632,007 A | 5/1997 | Freeman | |
| 5,661,787 A | 8/1997 | Pocock | |
| 5,677,739 A | 10/1997 | Kirkland | |
| 5,684,715 A | 11/1997 | Palmer | |
| 5,696,869 A | 12/1997 | Abecassis | |
| 5,696,905 A | 12/1997 | Reimer et al. | |
| 5,703,636 A | 12/1997 | Cifaldi | |
| 5,706,493 A | 1/1998 | Sheppard, II | |
| 5,708,845 A | 1/1998 | Wistendahl et al. | |
| 5,712,950 A | 1/1998 | Cookson et al. | |
| 5,715,400 A | 2/1998 | Reimer et al. | |
| 5,724,091 A | 3/1998 | Freeman et al. | |
| 5,724,103 A | 3/1998 | Batchelor | |
| 5,726,702 A | 3/1998 | Hamaguchi et al. | |
| 5,727,156 A | 3/1998 | Herr-Hoyman et al. | |
| 5,729,280 A | 3/1998 | Inoue et al. | |
| 5,731,846 A | 3/1998 | Kreitman et al. | |
| 5,731,847 A | 3/1998 | Tsukagoshi | |
| 5,734,436 A | 3/1998 | Abe et al. | |
| 5,774,170 A | 6/1998 | Hite et al. | |
| 5,774,664 A | 6/1998 | Hidary et al. | |
| 5,774,666 A | 6/1998 | Portuesi | |
| 5,778,181 A | 7/1998 | Hidary et al. | |
| 5,790,204 A | 8/1998 | Yamaguchi | |
| 5,794,207 A | 8/1998 | Walker et al. | |
| 5,798,785 A | 8/1998 | Hendricks et al. | |
| 5,799,268 A | 8/1998 | Boguraev | |
| 5,809,471 A | 9/1998 | Brodsky | |
| 5,809,512 A | 9/1998 | Kato | |
| 5,815,634 A | 9/1998 | Daum et al. | |
| 5,818,441 A | 10/1998 | Throckmorton et al. | |
| 5,818,935 A | 10/1998 | Maa | |
| 5,832,223 A | 11/1998 | Hara et al. | |
| 5,835,923 A | 11/1998 | Shibata et al. | |
| 5,850,352 A | 12/1998 | Moezzi et al. | |
| 5,855,516 A | 1/1999 | Eiba | |
| 5,861,881 A | 1/1999 | Freeman et al. | |
| 5,875,305 A | 2/1999 | Winter et al. | |
| 5,884,262 A | 3/1999 | Wise et al. | |
| 5,900,905 A | 5/1999 | Shoff et al. | |
| 5,900,908 A | 5/1999 | Kirkland | |
| 5,903,262 A | 5/1999 | Ichihashi et al. | |
| 5,903,816 A | 5/1999 | Broadwin et al. | |
| 5,905,865 A * | 5/1999 | Palmer et al. | 725/112 |
| 5,915,090 A | 6/1999 | Joseph et al. | |
| 5,918,012 A | 6/1999 | Astiz et al. | |
| 5,929,849 A | 7/1999 | Kikinis | |
| 5,931,908 A | 8/1999 | Gerba et al. | |
| 5,940,073 A | 8/1999 | Klosterman et al. | |
| 5,946,047 A | 8/1999 | Levan | |
| 5,963,645 A | 10/1999 | Kigawa et al. | |
| 5,969,715 A | 10/1999 | Dougherty et al. | |
| 5,970,511 A | 10/1999 | Kurita et al. | |
| 5,991,742 A | 11/1999 | Tran | |
| 5,995,976 A | 11/1999 | Walker et al. | |
| 6,002,394 A | 12/1999 | Schein et al. | |
| 6,006,257 A | 12/1999 | Slezak | |
| 6,014,184 A | 1/2000 | Knee et al. | |
| 6,025,837 A | 2/2000 | Matthews, III et al. | |
| 6,064,438 A | 5/2000 | Miller | |
| 6,092,112 A | 7/2000 | Fukushige | |
| 6,111,589 A | 8/2000 | De Haan | |
| 6,118,472 A | 9/2000 | Dureau et al. | |
| 6,181,334 B1 | 1/2001 | Freeman et al. | |
| 6,184,877 B1 | 2/2001 | Dodson et al. | |

(56) References Cited

U.S. PATENT DOCUMENTS

| | | |
|---|---|---|
| 6,193,610 B1 | 2/2001 | Junkin |
| 6,209,028 B1 | 3/2001 | Walker et al. |
| 6,215,484 B1 | 4/2001 | Freeman et al. |
| 6,225,993 B1 | 5/2001 | Lindblad et al. |
| 6,239,794 B1 | 5/2001 | Yuen et al. |
| 6,240,555 B1 * | 5/2001 | Shoff et al. ............... 725/110 |
| 6,256,785 B1 | 7/2001 | Klappert et al. |
| 6,263,501 B1 | 7/2001 | Schein et al. |
| 6,263,507 B1 | 7/2001 | Ahmad et al. |
| 6,264,560 B1 | 7/2001 | Goldberg et al. |
| 6,271,892 B1 | 8/2001 | Gibbon et al. |
| 6,324,694 B1 | 11/2001 | Watts et al. |
| 6,438,233 B1 | 8/2002 | Yoshimune et al. |
| 6,449,346 B1 | 9/2002 | Katz |
| 6,449,616 B1 | 9/2002 | Walker et al. |
| 6,496,981 B1 | 12/2002 | Wistendahl et al. |
| 6,526,219 B1 | 2/2003 | Posa et al. |
| 6,567,982 B1 | 5/2003 | Howe et al. |
| 6,601,103 B1 | 7/2003 | Goldschmidt Iki et al. |
| 6,637,032 B1 * | 10/2003 | Feinleib .................... 725/110 |
| 6,661,467 B1 | 12/2003 | Van Der Meer et al. |
| 7,454,776 B1 | 11/2008 | Walker et al. |

FOREIGN PATENT DOCUMENTS

| | | |
|---|---|---|
| CA | 2283940 | 10/1998 |
| CA | 2 554 135 | 7/2005 |
| DE | 3533848 C2 | 3/1987 |
| DE | 4007092 A1 | 9/1991 |
| DE | 4127013 A1 | 2/1993 |
| DE | 4141575 A1 | 6/1993 |
| DE | 4240187 A1 | 6/1994 |
| DE | 4409383 A1 | 3/1995 |
| DE | 19508489 A1 | 9/1995 |
| DE | 4446093 A1 | 7/1996 |
| DE | 19507739 A1 | 9/1996 |
| EP | 0974223 | 1/2000 |
| JP | 02-135993 | 5/1990 |
| JP | 02-223086 | 9/1990 |
| JP | 03-280686 | 12/1991 |
| JP | 04-163589 | 6/1992 |
| JP | 05-089184 | 4/1993 |
| JP | 05-183826 | 7/1993 |
| JP | 06-025459 | 2/1994 |
| JP | 06-029994 | 2/1994 |
| JP | 06-187379 | 7/1994 |
| JP | 06-208500 | 7/1994 |
| JP | 06-233205 | 8/1994 |
| JP | 06-243539 | 9/1994 |
| JP | 06-274552 | 9/1994 |
| JP | 06-295312 | 10/1994 |
| JP | 07-007684 | 1/1995 |
| JP | 07-085243 | 3/1995 |
| JP | 07-087038 | 3/1995 |
| JP | 07-107446 | 4/1995 |
| JP | 07-162776 | 6/1995 |
| JP | 07-162777 | 6/1995 |
| JP | 07-170499 | 7/1995 |
| JP | 07-236099 | 9/1995 |
| JP | 07-240881 | 9/1995 |
| JP | 07-283799 | 10/1995 |
| JP | 07-321748 | 12/1995 |
| JP | 07-321752 | 12/1995 |
| JP | 09-027936 | 1/1997 |
| JP | 09-037223 | 2/1997 |
| JP | 10-003451 | 1/1998 |
| JP | 10-003459 | 1/1998 |
| JP | 10-069511 | 3/1998 |
| JP | 11-136557 | 5/1999 |
| JP | 2000209483 | 7/2000 |
| JP | 2001504673 | 4/2001 |
| JP | 3-310158 | 7/2002 |
| WO | WO 94/00842 A1 | 1/1994 |
| WO | WO 95/28803 A1 | 10/1995 |
| WO | WO 95/32587 A1 | 11/1995 |
| WO | WO 96/07270 A1 | 3/1996 |
| WO | WO 96/13124 A1 | 5/1996 |
| WO | WO 96/27989 | 9/1996 |
| WO | 9805112 | 10/1998 |
| WO | WO 98/43406 | 10/1998 |

OTHER PUBLICATIONS

Andleigh et al., Multimedia Systems Design, *Prentice Hall PTR*, Upper Saddle River, New Jersey, 1996.

Andrews, Multimedia Wizard—Paul Allen Links Investments With Digital Foresight, The Seattle Times, *The Seattle Times Company*, Oct. 4, 1993, available at http://community.seattletimes.nwsource.com/archive/?date=19931024&slug=1727712; pp. 1-5.

Andrews, Technology: Time Warner's Ordinary People Plug Interactive TV, *The New York Times*, New York, New York, Dec. 18, 1994, 4 pages, available at http://www.nytimes.com/1994/12/18/business/technology-time-warner-s-ordinary-people-plug-interactive-tv.html?pagewanted=all&src=pm.

Andrews, Time Warner's 'Time Machine' for Future Video, *The New York Times*, Dec. 12, 1994; pp. 1-4.

Antonoff, Broadcasting the Web, *Popular Science*, at 31, Feb. 1996, available at http://www.popsci.com/archive-viewer?id=RGmvT92oB KsC &pg=31; p. 1.

Antonoff, Interactive Television, Popular Science, at 92-95, Nov. 1992, available at http://www.popsci.com/archive-viewer?id=ngEAAAAAMBAJ &pg=92.

Bender et al., *Network Plus (and associated block diagram)*, Paper presented at SPSE Electronic Imaging Devices and Systems Symposium, Los Angeles, Indexed in the MIT Media Library, Jan. 1988.

Blahut et al., Interactive Television, *Proceedings of the IEEE*, V. 83, No. 7, Jul. 1995 pp. 1071-1085.

Blank, Christine, The FSN Challenge: Large-Scale Interactive Television, *Computer*, May 1995. pp. 9-13.

Botto, Multimedia, CD-Rom & Compact Disc—A Guide for users and developers, *Sigma Press* (1992).

Bove, Jr., *Personalcasting: Interactive Local Augmentation of Television Programming 42* (1985) (thesis, MIT) (on file with MIT Library), available at http://web.media.mit.edu/~vmb/papers/personalcasting.pdf, Aug. 27, 1985; pp. 1-46.

Brown et al., Automatic Content-Based Retrieval of Broadcast News, *ACM Multimedia 95—Electronic Proceedings*, San Francisco, California, Nov. 5-9, 1995, 9 pages.

*CBC Newsworld—Videotron Videoway Expansion*, available at http://www.youtube.com/ watch?v=gqW6j2r-kSY.

Cheifet, PCTV, Inc. 1997, *Internet TV*, The Computer Chronicles, available at http://archive.org/details/CC1416_internet_tv.

CNN at Work, advertisement, *Infoworld*, Oct. 31, 1994; p. 1.

CNNfn Is the First Network to Lanuch on multiple Media Platforms, Press Release, *PRNewswire*, Nov. 29, 1995, available at http://www.thefreelibrary.com/CNNfn+IS+THE+FIRST+NETWORK+TO+LAUNCH+ON+MULTIPLE+MEDIA+PLATFORMS-a017772936; pp. 1-2.

*Communications Technology: Official Trade Journal of the Society of Cable Television Engineers*, 1990-1997.

Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011; 2105 pages [and Exhibits 1-55 and 58].

Complainant Walker Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Feb. 27, 2012; pp. 1-6.

Compton, Internet CNN Newsroom: The Design of a Digital Video News Magazine, (thesis indexed at the MIT Barker Engineering library), *IEEE*, MIT, May 1, 1995; pp. 296-301.

(56) References Cited

OTHER PUBLICATIONS

Cornyn, CD-I and the Media, *Proceedings of the AES 5th Intl Conf Music and Digital Technology, NY Audio Eng. Society*, 1987; pp. 233-244.
Cowan, CD ROM: Publishing Medium—Publishing Tool, *Micro Publishing Press* (1995); pp. 107, 153.
D&M Holdings, Inc., Denon Universal Audio/Video Player Model DBP-1611UD, Owner's Manual, *Denon*, Date: unknown; pp. 1-70 [Exhibit 5 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
D&M Holdings, Inc., Marantz Super Audio CD Blu-Ray Disc Player UD5005, User Guide, *Marantz*, Date: unknown; pp. 1-73 [Exhibit 6 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Department of Commerce, Patent and Trademark Office, Pilot Program for Waiver of Patent Owner's Statement in Ex Parte Reexamination Proceedings, Notices—Federal Register, vol. 75, No. 150, Aug. 5, 2010; pp. 47269-47270.
DiChristina, Off-Track Betting, *Popular Science*, Jun. 1995, at 47, available at http://www.popsci.com/archive-viewer?id=KrfIjdl-EMwC&pg=47.
Digital Video Broadcasting (DVB), Implementation Guidelines for Data Broadcasting, (Technical Report), European Telecommunications Standards, *European Broadcasting Bureau*; 2003; 1-64.
Dixon, *DVI Video/Graphics*, Computer Graphics World, Jul. 1, 1987; pp. 125-128.
Doidge et al., *MPEG Menu Manager*, IBM Technical Disclosure Bulletin, vol. 38, No. 09, Sep. 1, 1995, pp. 290-295.
Douglass, *Carlsbad Firm Makes Popular Games for TV, But No Profits*, San Diego Tribune Financial, Apr. 12, 1990, 2 pages.
Dow Jones Investor Network Debuts on Multimedia Division Home Page, *Business Wire*, Aug. 29, 1995; p. 6.
Droitcourt, Understanding How Interactive Television Set Top Box Works And What it Will Mean to the Customer, International Broadcasting Convention, Conference Publication No. 413, *IEEE*, Sep. 14-18, 1995, pp. 382-394.
DTS, Inc., *Sherwood Blu-ray Disc Player BDP-5004*, Operating Instructions, 2008; pp. 1-25 [Exhibit 35 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Dziatkiewicz, Intercast Could Reel in More $ for Carriers (Intel's New Interact Technology), America's Network, *Advanstar Communications Inc.*, vol. 99, No. 24, Dec. 15, 1995, available at http://global.factiva.com; pp. 1-2.
EarthWeb and Active TV Press Release: EarthWeb and ACTV Unveil—Hyper TV (TM) Breakthrough Java (TM)-Based Software Application Unites Television with the World Wide Web, Internet Archive Date Mar. 25, 1996.
EarthWeb and Active TV, Index page, Internet Archive Date: Nov. 6, 1996; p. 1.
EarthWeb and Active TV, Q&A re Hyper TV, Internet Archive Date: Nov. 6, 1996.
Einstein, PCs Leaving Television Behind in Interactive Race, *The San Francisco Chronicle*, Hearst Communications, Inc., Oct. 31, 1995; pp. 1-2, available at http://global.factiva.com.
Engels et al., Interactive Television or Through Personal Computer, *Focus Magazine Archive*, Magazine Issue No. 20, May 16, 1994.
First International Workshop on Wireless Image/Video Communications: Loughborough University, *IEEE Communications Society & EURASIP*, Loughborough, United Kingdom, Sep. 4-5, 1996; pp. 1-8.
Fix, Homeworker on the Computer, *Die Zeit Article*, Feb. 14, 1996.
Fleischmann, Do-It-Yourself TV, *Popular Science*, Nov. 1988, at 60-61, 66, available at http://www.popsci.com/archive-viewer?id=ZZLkjN3 PnkC&p g=60.
Florence, Bring Programs to Life with Digital Video, *PC Magazine*, May 17, 1994; pp. 283-298.
Fröhlich, *The Future of Java*, Jul. 3, 1996.
Funai Electric Co., Ltd., Magnavox Blu-ray Disc/DVD Player MBP5130/F7, Owner's Manual, *Funai Electric Co., Ltd.*, 2010, pp. 1-53 [Exhibit 8 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Furht (Editor), Distributed Multimedia Systems and Applications, *Proceedings of the IASTED/ISMM International Conference*, Honolulu, Hawaii, Aug. 15-17, 1994.
Furht et al., Design Issues for Interactive Television Systems, *IEEE Computer*, vol. 28, No. 5, May 1995. pp. 25-39.
Gates, The Road Ahead (& accompanying CD), *Penguin Group*, 1995; pp. 163-167.
Geibler, Surfing the Movie Space: Advanced Navigation in Movie-Only Hypermedia, German National Research Center for Information Technology, Integrated Publication and Information Systems Institute, San Francisco, California, Nov. 5-9, *ACM*, 1995, 13 pages.
Hall et al. (Co-Chairs), *The Fourth ACM International Multimedia Conference*, Multimedia 96 Proceedings, Boston, Massachusetts, Nov. 18-22, 1996.
Harman International Industries, Inc., *Harman/Kardon Blu-ray Disc Player BDP1*, Owner's Manual, 2008, pp. 1-34 [Exhibit 13 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Hec, Blu-ray Player BDP1, User Manual, *hec*, Date: unknown; pp. 1-110 [Exhibit 11 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Helgerson, CD-ROM Facilitating Electronic Publishing, *Van Nostrand Reinhold* (1995).
Hodge et al., Interactive Television Technology: From Server to Set-Top, *SIMBA Information Inc.*, Wilton, Connecticut, 1995.
Hodge, Interactive Television: A Comprehensive Guide for Multimedia Technologists, *McGraw-Hill*, New York, 1995.
Hoffos et al., *CD-I Designers Guide*, McGraw-Hill Book Company, Chapters 2-3, 5, and 7, incl. e.g. pp. 143-148 (1992).
Hutchison et al., *Multimedia Transport and Teleservices: International COST 237 Workshop*, Vienna, Austria, Nov. 13-15, 1994.
Hutchison et al., *Teleservices and Multimedia Communications*, Second International COST 237 Workshop, Copenhagen, Denmark, Nov. 20-22, 1995.
Hyper TV, *A joint venture of EarthWeb and ACTV*, https://www.hypertv.com, as preserved the by Internet Archive's Wayback Machine, Nov. 6, 1996; pp. 1 [2 copies].
HyperTV, *HyperTV Q & A*, as preserved the by Internet Archive's Wayback Machine, Nov. 6, 1996; pp. 1-3.
HyperTV, *Java™-Based Software Application Unites Television with the World Wide Web*, as preserved the by Internet Archive's Wayback Machine, Mar. 25, 1996.
Intel, *Presentation regarding Intel Intercast System at National Association of Broadcasters Exhibition*, 1996.

(56) References Cited

OTHER PUBLICATIONS

*Intercast Website*, www.intercast.org, as preserved by the Internet Archive's Wayback Machine, Oct. 29, 1996; p. 1.
*International Conference of the MDA—6th*, Cambridge, England, 1993.
International Workshop on Multimedia Software Development: Proceedings, IEEE Computer Society Technical Council on Software Engineering, Berlin, Germany, *IEEE Computer Society Press*, Mar. 25-26, 1996; pp. 1-4.
Kelly et al., *An Architecture for Multiple Perspective Interactive Video*, University of California, San Francisco, California, Nov. 5-9, 1995, 23 pages.
Kim et al., A Media Synchronization Scheme for Distributed Multimedia Systems, Distributed Multimedia Systems and Applications, Honolulu, Hawaii, *Proceedings of the IASTED/ISMM International Conference*, Aug. 15-17, 1994, pp. 163-166.
Koenig, *A New CD-ROM for Interactive Entertainment*, Die Zeit Artikel, Apr. 26, 1996.
Koninklijke Philips Electronics N.V., *Philips Blu-ray Disc Player BDP3306*, Specification Sheet, Koninklijke Philips Electronics N.V., Oct. 18, 2011; pp. 1-4 [Exhibit 26 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Koninklijke Philips Electronics N.V., Philips Blu-ray Disc Player BDP3306/F7 & BDP3306/F8, User Manual, *Koninklijke Philips Electronics N.V.*, Date: unknown; pp. 1-69 [Exhibit 27 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Lambert, CD-I and Interactive Videodisc Technology, *Howard W. Sams & Co.* (1987).
Lamont et al., Synchronization Architecture and Protocols for a Multimedia News Service Application, Proceedings of the International Conference on Multimedia Computing and Systems, Boston, Massachusetts, May 14-19, *IEEE*, 1994, pp. 3-8.
*Le CD Interactif de A to Z*, Video Broadcast Hebdo, No. 8 Nouvelle Serie, Oct. 30-Nov. 5, 1992, p. 13.
Lean et al. (Chair/Editor), Display Devices and Systems, *SPIE—The International Society for Optical Engineering*, COEMA—China Optics & Optoelectronic Manufacturers Association, Nov. 6-7, 1996; pp. 1-6.
Lee et al., *Multimedia: Full Service Impact on Business, Education, and the Home*, Philadelphia, Pennsylvania, Oct. 23-24, 1995.
Lees (Editor), *Museums and Interactive Multimedia*, The Sixth International Conference of the MDA and The Second International Conference on Hypermedia and Interactivity in Museums, Cambridge, England, Sep. 20-24, 1993.
Lewis et al., Content Based Navigation in Multimedia Information Systems, *ACM Multimedia 96*, 1996, pp. 415-416.
LG Electronics USA, Inc., 3D Blu-ray Disc Player BD670, Specification Sheet, *LG Electronics USA, Inc.*, 2011; pp. 1-3 [Exhibit 15 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
LG Electronics USA, Inc., Network 3D Blu-ray Disc Player BD670, Owner's Manual, *LG Electronics USA, Inc.*, Date: unknown; pp. 1-69 [Exhibit 16 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Li et al. (Chairs/Editors), *Electronic Imaging and Multimedia Systems*, Bellingham, Washington, Nov. 4-5, 1996.
Lippman et al., News and Movies in the 50 Megabit Living Room, *IEEE* CH2520 (GLOBECOM '87), 1987, available at http://timokinnunen.net/50megab.htm, 13 pp.
Magnavox, Blue-ray Disc Player MBP5130/F7, Product Specification, *Magnavox*, Aug. 20, 2010; pp. 1-3 [Exhibit 9 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Maitan (Chair/Editor), Enabling Technologies for High-Bandwidth Applications, *Communications Technology: Official Trade Journal of the Society of Cable Television Engineers*, Boston, Massachusetts, Sep. 10-11, 1992.
Mayer-Patel et al., *Synchronized Continuous Media Playback Through the World Wide Web*, Multimedia 96 Proceedings, The Fourth ACM International Multimedia Conference, Boston, Massachusetts, Nov. 18-22, 1996, pp. 435-436.
McCarthy, Stepping out onto mainStreet GTE breaks new ground with interactive TV service, *Connected Planet Online*, Dec. 2, 1996, available at http://connectedplanetonline.com/m ag/telecom_stepping_onto_mainstreet/; pp. 1-2.
*Mercury—Over the Horizon*, available at http://www.youtube.com/watc h?v=5 iEe0YwT1IA.
Milenkovic, Delivering Interactive Services to Home Using Digital Video Broadcast Infrastructure, *IEEE*, 1997, pp. 133-142.
MIT Media Lab, 1987 demonstration video.
Mothersole, *Teletext Signal Generation Equipment and Systems*, IEEE Transactions on Consumer Electronics, vol. CE-25, Jul. 1, 1979, pp. 345-352.
Muller, *Multi-Media: The Fight for Technology and Markets*, Jan. 3, 1996.
Murphy, HyperTV Fuses Java with Television—EarthWeb and ACTV Partner to Bring Narrowcasting to the Internet, *Javaworld*, May 1, 1996; pp. 1-2.
Murray, *Hamlet on the Holodeck: The Future of Narrative in Cyberspace, Chapter 9*, (1997).
Nadeau, Byte Guide to CD-ROM, Second Edition, *Osborne McGraw-Hill*; pp. 158-174, 178-464, Appendix B, including attached CD (1995) [2 copies].
*NATPE Convention—Broadcasters Embrace Online*, Newsbytes News Network, Las Vegas, Nevada, Jan. 24, 1996.
Negroponte, Bit by Bit, PCs Are Becoming TVs. Or Is It the Other Way Around?, *Wired*, Aug. 1, 1995, available at http://web.media.mit.edu/~nicholas/Wired/WIRED3-08.html; pp. 1-3.
Negroponte, Object-Oriented Television, Wired, Jul. 1996, 3 pp.
Netravali et al., Digital Television: A Perspective, *Proceedings of the IEEE*, Jun. 1, 1995, pp. 834-842.
O'Malley, Web tv, *Popular Science*, Oct. 1996; pp. 49-53.
Onkyo Sound & Vision Corp., Blu-ray Disc Player BD-SP309, *Onkyo Sound & Vision Corp.*, 2011; pp. 1-189 [Exhibit 18 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Orion Sales, Inc., Sansui Blu-ray Disc Player BDP3959, Owner's Manual, *Orion Sales, Inc.*, 2008; pp. 1-76 [Exhibit 20 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Panasonic Corp., *Panasonic Blu-ray Disc Player DMP-BDT210 & DMP-BDT110*, Onwer's Manual, 2010, pp. 1-45 [Exhibit 24 of Com-

(56) References Cited

OTHER PUBLICATIONS plainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Perry (Senior Editor), "The Trials and Travails of Interactive TV," *IEEE Spectrum*, Apr. 1, 1996, pp. 22-28.
Philips Electronics UK Ltd., Introducing CD-I, *Addison-Wesley Publishing Company* (1992).
Philips Electronics UK Ltd., The CD-I Design Handbook, *Addison-Wesley Publishing Company* (1).
Philips International, Inc., Compact Disc-Interactive: A Designer's Overview, *McGraw-Hill Book Company*, 1988; pp. 41-42 [2 copies].
Pioneer Corp., Pioneer Blu-ray Disc Player BDP-330, Operating Instructions, *Pioneer Corp.*, 2010, pp. 1-197 [Exhibit 29 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Plaintiff Walker Digital, LLC Complaint for Patent Infringement, of *Walker Digital, LLC v. Apple Inc. et al.*, pending in the U.S. District Court for the District of Delaware, Civil Action 1:99-mc-09999, Apr. 22, 2011; pp. 1-28.
Plaintiff Walker Digital, LLC Complaint for Patent Infringement, of *Walker Digital, LLC v. Ayre Accoustics, Inc. et al.*, pending in the U.S. District Court for the District of Delaware, Civil Action 1:11-cv-00321-UNA, Apr. 11, 2011; pp. 1-18.
Pohlmann, *The Compact Disc: A Handbook of Theory and Use*, (Jun. 11, 1905).
*Point and Shoot*, www.ntn.com and associated pages, as archived by the Internet Archive's Wayback Machine on Nov. 12, 1996 at http://web.archive.org/web/19961112144831/htt p://www.ntn.com/; p. 1.
Pollack, New Interactive TV Threatens the Bliss of Couch Potatoes, *The New York Times*, New York, New York, Jun. 18, 1990, 5 pages, available at http://global.factiva.com.
Pompili, Custom Corporate News for the Corporate Site, *PC Magazine*, at 208-211, Apr. 9, 1996, available at http://www.popsci.com/archive-viewer?id =ngEAAAAAMBAJ&pg=92.
Press Release, *HyperTV Breakthrough Java-Based Software Application Unites Television With The World Wide Web*, available via the Internet Archive's Wayback Machine, Mar. 25, 1996.
Press, The Internet and Interactive Television, *Communications of the ACM*, Dec. 1, 1993, pp. 19-23, 140.
Proceedings of the First International Workshop on Community Networking: Integrated Multimedia Services to the Home, *IEEE Communications Society in collaboration with ACM SIGCOMM*, Internet Society, and Smart Valley, Millbrae, California, Jul. 13-14, 1994; pp. 1.
*Proceedings of the International Conference on Multimedia Computing and Systems*, IEEE Computer Society Task Force on Multimedia Computing, Boston, Massachusetts, May 14-19, 1994; p. 1.
*Proceedings of the International Conference on Multimedia Computing and Systems*, IEEE Computer Society Technical Committee on Multimedia Computing, Washington, D.C., May 15-18, 1995.
Proceedings of the International Conference on Multimedia Computing and Systems, IEEE Computer Society Technical Committee on Multimedia Computing, Hiroshima, Japan, *IEEE Computer Society Press*, Jun. 17-23, 1996; pp. 1-8.
Proceedings of the Second International Workshop on Community Networking: Integrated Multimedia Services to the Home, IEEE Communications Society in collaboration with ACM SIGCOMM, Princeton, New Jersey, *ACM SIGCOMM*, Jun. 20-22, 1995; pp. 1-4.
Proceedings SPIE vol. 901, Image Processing, Analysis, Measurement, and Quality, part of SPSE's International Symposium and Exposition on Electronic Imaging Devices and Systems '88, *SPIE*, Jan. 13-15, 1988, Los Angeles, California; pp. 1-7.

Rangan (Program Chair), *ACM Multimedia 93*, Proceedings: First ACM International Conference on Multimedia, Anaheim, California, Aug. 1-6, 1993.
Raskin, *Creating Multimedia to Die For*, PC Magazine, pp. 209-251, Feb. 22, 1994, available at http://goo.gl/F2cBy.
Respondents D&M Holdings, Inc et at., *Joint Identification of Proposed Terms and Claim Elements for Construction*, in the matter of Certain Blu-Ray Disc Players, Components Thereof and Products Containing Same, Investigation No. 337-TA-824, before the U.S. International Trade Commission, Washington, D.C., Feb. 27, 2012; pp. 1-20.
Respondents Funai Electric Co., Ltd., et al., *Notice of Prior Art*, in the matter of Certain Blu-Ray Disc Players, Components Thereof and Products Containing Same, Investigation No. 337-TA-824, before the U.S. International Trade Commission, Washington, D.C., Apr. 5, 2012; pp. 1-57.
Rodriguez et al. (Chairs/Editors), *Multimedia Computing and Networking 1995*, The Society of Imaging Science and Technology, The International Society for Optical Engineering, IEEE Computer Society, IEEE Communication Society, San Jose, California, Feb. 6-8, 1995.
Rose et al., The End of TV as we Know It: Forget HDTV. Forget Interactive Television. Forget the 500-Channel Universe. Instead Start Thinking PCTV, *Fortune*, Dec. 23, 1996; pp. 1-7.
Samsung Electronics America, Inc., Samsung Blu-ray Disc Player BD-C5500 & BD-C5500C, User Manual, *Samsung Electronics America, Inc.*, Date: unknown; pp. 1-69 [Exhibit 31 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Sanders, PC Meets TV: The Plot Thickens, *Business Week*, Dec. 22, 1996, available at http://www.businessweek.com/stories/1996-12-22/pc-meets-tv-the-plot-thickens; 3 pages.
Sharp Electronics Corp., *Sharp Blu-ray Disc/DVD Palyer BD-HP25U*, Operation Manual, Revised Dec. 17, 2010; pp. 1-73 [Exhibit 33 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Sherman, CD-ROM Handbook, Second Edition, Chapter 18: CD-ROM Interactive Multimedia Magazine, *McGraw-Hill Book Company*, 1994, pp. 461-484.
Song et al., COSMOS: A Framework for Real-Time Multimedia Group Presentation, *Multimedia Computing and Networking 1995*, vol. 2417, San Jose, California, Feb. 6-8, 1995, pp. 215-224.
Sony Computer Entertainment America LLC, *PLAYSTATION3 to Support New Interactive Blu-ray Movie Features (BD-LIVE) With Upcoming System Software Update*, available at http://us.playstation.com/corporate/about/press-release/460.html on Aug. 23, 2011; pp. 1-4 [Exhibit 43 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Sony Corp., Sony Blu-ray Disc/DVD Player BDP-S570/BX57, Operating Instructions, *Sony Corp.*, 2010, pp. 1-40 [Exhibit 41 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Sony Electronics Inc., Sony 3D Blu-ray Disc Player, Specification Sheet, *Sony Electronics Inc.*, Last Updated Dec. 1, 2010; pp. 1-3 [Exhibit 42 of Complainant Walker Digital, LLC's Complaint under

(56) References Cited

OTHER PUBLICATIONS

Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Staff Writer, *NBC Stakes a Claim on PC-TV Future*, CNET_News. com, Jun. 29, 1996, 7 pages.
Sun Microsystems, Java 2 Platform, Micro Edition (J2ME) Web Services Specification, *Datasheet*, 2003; pp. 1-2.
Takiff, Cable TV Strikes Back, *Popular Science*, Feb. 1997, at 66-69, available at http://www.popsci.com/archive-viewer?id=ZYFWnd7vVZcC& pg=66.
Television of the Future with BBC-2's 'The Net,' *M2 Presswire*, M2 Communications, May 12, 1995; pp. 1-2.
Tescher et al., *Integration Issues in Large Commercial Media Delivery Systems*, SPIE—The International Society for Optical Engineering, Philadelphia, Pennsylvania, Oct. 23-24, 1995.
*The Road Ahead—Bill Gates Comdex Keynote 1995*, available at http://www.youtube.com/watch?feature=player_embedded &v=oOO0Xjpjvfc#!, at 18:18.
*U S Avenue—Interactive TV*, available at http://www.youtube.com/watch?v=Zu1_kVxvA6c.
Vecchi, Broadband Networks and Services: Architecture and Control, *IEEE Communications Magazine*, Aug. 1995, pp. 24-32.
Ventre et al., *Multimedia Telecommunications and Applications: Third International COST 237 Workshop*, Barcelona, Spain, Nov. 25-27, 1996.
Vercelli, *Broadband Strategies and Technologies for Wide Area and Local Access Networks*, SPIE—The International Society for Optical Engineering, Berlin, Germany, Oct. 10-11, 1996.
Vijayan, Intel, CNN put cable news on desktops, *Computerworld*, Oct. 31, 1994, available at http://goo.gl/SzYjC; p. 1.
Vizard, Putting the Internet on Big-Screen TV, *Popular Science*, Jul. 1996, at 50, available at http://www.popsci.com/archive-viewer?id=tblziB7YD JoC&p g=50.
Vizio, Inc., Vizio 3D Blu-ray Player with Internet Apps VBR133, User Manual, *Vizio, Inc.*, 2011; pp. 1-51 [Exhibit 47 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Whitehead et al., Time Warner Cable's Full Service Network—Program Management of the FSN Virtual Organization, *IEEE*, Integrated Multimedia Services to the Home, Proceedings of the Second International Workshop on Community Networking, 1995, pp. 291-298.
Yamaha Corp., Yamaha Blu-ray Disc Player BD-S667, Owner's Manual, *Yamaha Corp.*, 2010; pp. 1-45 [Exhibit 49 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Young, Toshiba Blu-ray Disc Player BDX2500KU, Owner's Manual, *Toshiba Corporation*, 2010; pp. 1-61 [Exhibit 45 of Complainant Walker Digital, LLC's Complaint under Section 337 of the Tariff Act of 1930, as Amended, Digital, LLC's List of Claim Terms to be Construed from U.S. Patent No. 6,263,505, in the matter of Certain Blu-Ray Disc Players, Components Thereof and Products Containing Same, Investigation No. 337-TA-824, before the U.S. International Trade Commission, Washington, D.C., Dec. 3, 2011].
Office Action for U.S. Appl. No. 08/886,006 mailed Oct. 27, 1999, 8 pp.
Notice of Allowance for U.S. Appl. No. 08/886,006 mailed Nov. 16, 2000, 4 pp.
Final Office Action for U.S. Appl. No. 09/785,902 mailed Jan. 26, 2005, 17 pp.
Office Action for U.S. Appl. No. 09/785,902 mailed Jul. 20, 2004, 20 pp.
Office Action for Re-Exam U.S. Appl. No. 90/009,918 mailed Nov. 18, 2011, 28 pp.
Office Action for Re-Exam U.S. Appl. No. 90/009,918 mailed Mar. 22, 2012, 123 pp.
Office Action for Re-exam U.S. Appl. No. 90/011,933 mailed Nov. 23, 2011, 18 pp.
A joint venture of EarthWeb and ACTV, www.hypertv.com, Download Date: Mar. 24, 1998. 4 pp.
Kurtz, Josh, "Technology; A way to Hear Stock Quotes While Watching Cartoon", Apr. 14, 1991, The New York Times, Section 2, p. 8. 3 pp.
Parisi, Paula, Venevision into US PPV, Dec. 29, 1992, The Hollywood Reporter. 2 pp.
Stern, Christopher, "Cable Operators look for other Revenue Streams", Jul. 26, 1993, Broadcasting & Cable, vol. 123, No. 30, 2 pp.
General Instrument Corporation Reports Record Fourth Quarter and Full year 1994 Results; Fourth Quarter Sales up by 32 Percent over 1993; Net Income up 44 Percent Before Income Tax benefit, Feb. 1, 1995, Financial News Section. 4 pp.
"Dow Jones Investor Network debuts on Multimedia Division Home Page", Aug. 29, 1995, Business Wire. 1 pp.
Britton, Bonnie, "Special Videos Narrate the Action for Viewers with Visual Impairments", Oct. 15, 1995, The Indianapolis Star, p. 104. 1 pp.
"Dow Jones Investor Network Broadcasts Greenspan Live Tonight", Oct. 9, 1995, Business Wire. 2 pp.
"Xensei, Internet Business Solutions that Work", (http://www.xensei.com/profile), Download Date: Mar. 21, 2000. 2 pp.
PCT Written Opinion for Application PCT/US98/05112, Feb. 19, 1999, 88 pp.
PCT International Search Report for Application PCT/US98/05112, mailed Aug. 2, 1998, 2 pp.
Office Action for U.S. Appl. No. 09/660,579, dated Jan. 25, 2008, 19 pp.
Office Action for U.S. Appl. No. 09/660,579, dated Sep. 19, 2007, 16 pp.
Office Action for U.S. Appl. No. 09/660,579, dated Apr. 9, 2007, 15 pp.
Office Action for U.S. Appl. No. 09/660,579, dated Jul. 31, 2006, 14 pp.
Office Action for U.S. Appl. No. 09/660,579, dated Jun. 6, 2005, 15 pp.
Office Action for U.S. Appl. No. 09/660,579, dated Aug. 24, 2004, 18 pp.
Office Action for U.S. Appl. No. 08/821,436, dated Apr. 12, 2000, 9 pp.
Office Action for U.S. Appl. No. 08/821,436, dated Oct. 25, 1999, 11 pp.
Office Action for U.S. Appl. No. 08/821,436, dated Feb. 3, 1999, 12 pp.
Notice of Allowance for U.S. Appl. No. 12/272,190, mailed Nov. 9, 2012, 7 pp.
Notice of Allowance for U.S. Appl. No. 12/272,190, mailed Jun. 22, 2012, 7 pp.
Notice of Allowance for U.S. Appl. No. 12/272,190, mailed Mar. 23, 2011, 8 pp.
Office Action for U.S. Appl. No. 12/272,190, mailed Oct. 15, 2010, 8 pp.

\* cited by examiner

| PROGRAM NAME F4 | PROGRAM ID NUMBER F5 | NETWORK ID NUMBER F6 | BROADCAST TIMES F7 | PARTICIPATING CHARACTERS F8 | PHONE NUMBER F9 |
|---|---|---|---|---|---|
| DAYS OF OUR LIVES | DL74 | 04 | 1:00PM EST | MARLENA, BO, ROMAN, HOPE | 1-900-789-DAYS |
| | | | | | |
| | | | | | |
| | | | | | |

R5 ← (points to first data row)

PROGRAM DATABASE 400

FIG. 4

CHARACTER DATABASE 500

| CHARACTER NAME F10 | CHARACTER NUMBER F11 | PROGRAM ID NUMBER F12 |
|---|---|---|
| MARLENA | 43 | DL74 |
| BO | 54 | DL74 |
| ROMAN | 46 | TL64 |
| HOPE | 78 | TL64 |

R6 → MARLENA row
R7 → BO row
R8 → ROMAN row
R9 → HOPE row

FIG. 5

BILLING DATABASE 700

| CALLER TELEPHONE NUMBER F19 | 900 NUMBER DIALED F20 | PROGRAM ID NUMBER F21 | CHARACTER NUMBER F22 | RECORDING NUMBER F23 | TOTAL TIME EXPIRED F24 | FINAL DOLLAR AMOUNT F25 | CALLER VERIFIED RATE F26 |
|---|---|---|---|---|---|---|---|
| (203) 614-3295 | 345-6687 | OLTL55 | | | 0:45 | | $1.95/MIN |
| (203) 614-3242 | 345-7789 | DL65 | | | 34:55 | | $1.95/MIN |
| (203) 614-3241 | 456-9796 | SDC-84 | | | 15:11 | | $2.95/MIN |
| (203) 614-3269 | 874-9876 | HD-847 | | | 60:00 | | $20.00/SHOW |

R11 → row 1
R12 → row 2
R13 → row 3
R14 → row 4

FIG. 7

SYSTEM AND METHOD FOR SUPPLYING SUPPLEMENTAL AUDIO INFORMATION FOR BROADCAST TELEVISION PROGRAMS

CROSS-REFERENCE TO RELATED APPLICATIONS

This application is a continuation of U.S. patent application Ser. No. 12/272,190 filed Nov. 17, 2008 entitled SYSTEM AND METHOD FOR SUPPLYING SUPPLEMENTAL AUDIO INFORMATION FOR BROADCAST TELEVISION PROGRAMS, which is a continuation of U.S. patent application Ser. No. 09/660,579, filed Sep. 12, 2000, and which issued as U.S. Pat. No. 7,454,776 on Nov. 18, 2008, which is a continuation of U.S. patent application Ser. No. 08/821,436 entitled filed Mar. 21, 1997, and which issued as U.S. Pat. No. 6,209,028 B1 on Mar. 27, 2001. The entire contents of each of the above applications are hereby incorporated by reference herein for all purposes.

BACKGROUND OF THE INVENTION

This invention relates to the field of broadcast television programs. More particularly, the present invention provides a system and a method for television viewers to receive additional dialog and information, via a selected interface, related to characters on a specific broadcast television program.

Many television (TV) programs, such as daytime soap operas and situation comedies, are regularly watched by large audiences. Considering the growing number of TV sets in homes and the amount of time the average person spends watching TV, the size of the audience is expected to increase over time. Correspondingly, programs need to change and evolve to suit the ever-more diverse tastes and interests of this expanding audience.

Television networks, cable companies and independent TV program providers offer a myriad of TV program categories to capture the interest of viewers. These TV program categories include, for example, game shows, talk shows, situation comedies, sporting events, and soap operas. The ultimate goal is to provide interesting programming, in order to capture a large segment of the viewing audience.

One popular category of TV programming is the daytime soap opera. This type of program revolves around the day-to-day lives of characters featured within the program. A plot or story-line for a typical soap opera can span several episodes, possibly an entire TV season. Each episode continues and develops the story-line further, and also develops the personalities of characters within the soap opera in an ever-expanding and detailed manner.

Soap operas, as well as other TV programs, often develop a core group of passionate and dedicated viewers. Many viewers religiously watch every episode of their favorite TV programs—loathing to miss even a single episode. With these viewers in mind, several magazines on the market summarize daily or weekly episodes of television programs for people who may have missed a particular episode. There are also 900 telephone numbers available that offer similar services for a fee. These are just two areas in which peripheral services have developed in response to TV viewer's demand.

Moreover, many TV viewers are extremely involved in their favorite TV program's story-line and characters. The writers of TV programs must weave complex and interesting plots to maintain the viewer's loyalty and interest in the program. In most instances, multi-faceted and well-developed characters are essential to the popularity (and longevity) of the program. Thus, a typical script for a TV program may be written, revised and edited numerous times to ensure that the result is interesting, realistic, believable or humorous.

Writers and producers spend a great deal of time developing characters and story-lines for TV programs that ultimately are not used in the broadcast version of the TV program. Many times several scripts, each with different plot twists and dialogue, are developed for each TV program episode. This is occasionally done to preserve the secrecy of the final broadcast episode. However, more often than not, these changes and alternate scripts are never broadcasted. Thus, the TV program producers and developers have no outlet to display this additional work-product (or by-product, as the case may be) to the viewing public.

To a certain extent, dedicated viewers of, for example, a soap opera, live vicariously through the trials and tribulations of the TV characters. Any additional information on their favorite TV program is of interest to these viewers, particularly, the thoughts, feelings and motivations that help define the TV characters.

However, the typical TV program format makes it difficult to develop the thoughts and feelings for a TV character in great detail. The story-line in a TV program must flow in a relatively quick and fluid manner. Unlike a novel, where an author can, between exchanges of dialogue, devote extensive time to a given character's thoughts, motivations, and considerations, the dialogue in TV programs must flow in a real-time manner. In many situations, this means that the writers must briefly summarize the thoughts or motivations of a character to keep the action flowing smoothly.

For example, a soap opera might have the lead female character saying to the lead male character: "I am going to New York for lunch. Would you like to join me?" However, her thoughts, which are not being broadcasted, may have her contemplating several devious things she is considering doing while in New York. These devious machinations may or may not occur depending upon the road the writers decide to follow for the story-line.

A wealth of non-broadcast material (from story-line changes and revisions) could be created and used to supplement the audio tracks of TV programs. In the example discussed above, a parallel audio track could be used to provide the additional thoughts of the lead female character to listeners who are simultaneously watching the TV broadcast.

In this regard, modern stereo televisions can receive a secondary audio channel (SAP). SAP technology has been used to provide descriptive video (DVS), which prints words on the television screen describing the action for the deaf. SAP has also been used to provide non-English audio tracks for the TV programs or sporting events, as well as a running commentary on TV movies. Some radio stations also broadcast audio tracks of live events (e.g. sporting events) or TV programs.

However, these conventional simulcasting systems provide everyone using the system with the same audio track; i.e., all viewers (or listeners) using these systems receive the same information. There is no way for a TV viewer to select individual information, for example, additional dialogue or thoughts of a particular character on a TV soap opera program. Moreover, these systems are typically provided for a monthly or annual service fee or are provided at no cost, because charging on a per-TV program or per-use basis is administratively difficult to process, or not possible at all.

Other systems have been developed using community antenna television facilities (CATV) that allow subscribers to interactively request still-television video frames with an accompanying audio message. However, the TV video and accompanying audio message provided by these systems are not related to, or synchronized to, broadcast TV programs.

Phone services (e.g. chat rooms and conference calling systems) also exist that allow callers to dial-in and listen to pre-recorded audio messages or even listen to live events in progress. When a caller uses a dial in service to listen to a sporting event, for example, which is being simultaneously broadcasted on TV, the radio audio track replaces the TV audio track. Thus, these services are not synchronized to the TV program's audio track and are not designed to supplement the dialogue for the TV program.

Until now, producers and broadcasters of TV programs have not been able to benefit from non-broadcast material developed in relation to a TV program's story-line or characters. Therefore, synchronized audio tracks providing supplemental information for TV programs have not been created. This supplemental audio information would be of great interest to devoted fans of TV programs. In addition, TV program broadcasters would have an alternative venue to bolster their TV program's characters, thereby creating even greater interest in the particular TV program. Accordingly, there is a need for a system that solves the above described problems. In particular, a system that permits TV producers to provide additional valuable entertainment content to interested viewers.

SUMMARY OF THE INVENTION

The present invention solves the foregoing deficiencies by providing a system and a method for enabling television program viewers to receive supplemental information related to the television program.

The present invention advantageously enables television program viewers to select supplemental information related to particular characters in a television program through a telephone network interface. The selected supplemental information is then received by the viewer via an appropriate interface.

In particular, one aspect of the present invention is directed to a method of supplying supplemental audio information that is synchronized to a broadcast television program so that the supplemental audio information is not in conflict with the audio component of the television program. This method includes providing selection and synchronization information through the broadcast television program, and supplying the supplemental audio information in accordance therewith.

Other aspects of the present invention are described below.

BRIEF DESCRIPTION OF THE DRAWINGS

FIG. 4 is a table depicting the program database within the service controller of FIG. 2.

FIG. 5 is a table depicting the character database within the service controller of FIG. 2.

FIG. 7 is a table depicting the billing database within the service controller of FIG. 2.

DETAILED DESCRIPTION OF THE PREFERRED EMBODIMENTS

In a preferred embodiment of the present invention, writers for a TV program write supplemental dialogue for specific characters featured in the TV program. This supplemental dialogue consists of "thoughts" and "comments" not spoken aloud during the broadcast version of the TV program. For example, these thoughts could include a hidden agenda, a character's true feelings toward another character, or other motivational factors driving a character's actions. While many devoted fans are interested in this type of information, it is not easily conveyed to the viewing audience during the real-time exchange of dialogue between characters on the TV program.

In the present invention, audio recordings of these thoughts and comments are recorded using actors from the TV program. Of course, voice-doubles for the actors could also be used to make the audio recordings. The audio recordings are then edited and synchronized to the broadcast TV program. This process ensures that the additional thoughts and comments do not overlap the dialogue being spoken on the broadcast version audio track. These thoughts and comments are interspersed during the non-speaking periods and other appropriate periods in the TV program so that they can be listened to simultaneously with the TV program without conflict.

In alternative embodiments, the supplemental audio information can be used for other purposes. Several examples of other types of supplemental audio information for TV programs include: adult content and themes not available on the regular program, and multiple audio tracks of the same TV program, which provide different sets of audio information each time the TV program is viewed (and listened to). For example, each viewing could offer the hidden thoughts of a different character, or offer the viewer clues (e.g., hints concerning alternative actions or events that may or may not occur). This may give the viewer the sense that he is somehow participating in the show. Supplemental audio information can also be used to provide additional content, also referred to as "hyper-content," for news-type programs, consisting of information not included in the broadcast (e.g. an unabridged news report).

Traditional methods of broadcasting audio tracks, such as SAP or radio, are not suitable for the present application. The supplemental audio information must be made available only to customers requesting the service (i.e. not broadcasted to the world). In addition, there may be multiple versions of supplemental audio information for a particular TV program, so that different customers can choose different supplemental audio information for the same TV program, or watch the same TV program multiple times with different supplemental audio information each time. The supplemental audio information is synchronized with the audio track of the broadcast TV program-enhancing the audio track rather than merely replacing it.

Figure 1:
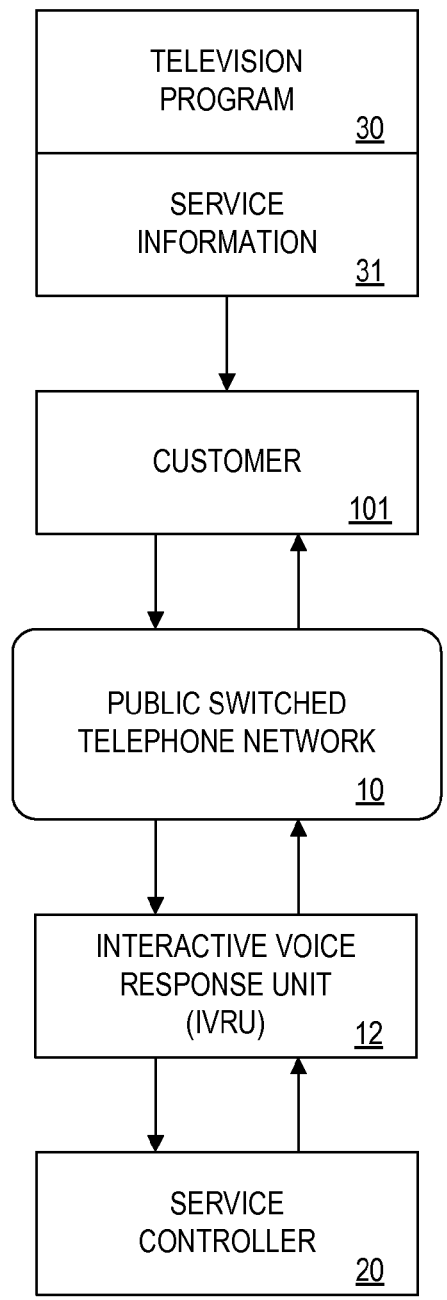
FIG. 1 is a block diagram overview of one system constructed in accordance with the present invention.

FIG. 1 shows an overall system block diagram of a preferred embodiment of the present invention. In this embodiment, a customer 101 receives service information 31, which is displayed discretely during the broadcast of a television program 30. The service information 31 comprises a 900 telephone number and a program identification code. The program identification code is a ten digit alphanumeric code comprising selection information and synchronization information (none of which are shown). The service information 31 is used by the customer 101 to request specific supplemental audio information related to the television program 30, as discussed below.

It is understood that the television program 30 is one of many television programs that are broadcasted or transmitted to the public. The television program 30 is received and displayed by conventional electronic equipment (i.e. a television set, not shown) located in close proximity to the customer. The electronic display equipment may receive the television program 30 through an antenna adapted to receive TV signals from a TV broadcast station, from a satellite transponder, a trunk cable from a CATV (i.e. cable TV) system, or from any other suitable transmission means.

The service information 31 is recorded on the same recording medium as the television program 30. For example, a television program can be recorded and then the service information 31 can be added during editing of the recorded television program. The service information 31 can also be added at the time of broadcasting the television program 30.

It is also understood that the service information 31 would be displayed even if the television program 30 is recorded on a recorded medium and played-back by the customer. While one customer is depicted in FIG. 1 receiving the service information 31 from the television program 30, it is understood that the television program 30 is broadcasted to any number of customers simultaneously.

As illustrated in FIG. 1., the customer, by utilizing his telephone (not shown), communicates through a public switch telephone network 10 (PSTN) and an interactive voice response unit, IVRU 12, to a service controller 20. The customer provides the selection information and synchronization information, to the service controller 20. In response, the service controller 20 sends the supplemental audio information to the customer. The communication process via the telephone is discussed in detail below.

Figure 2:
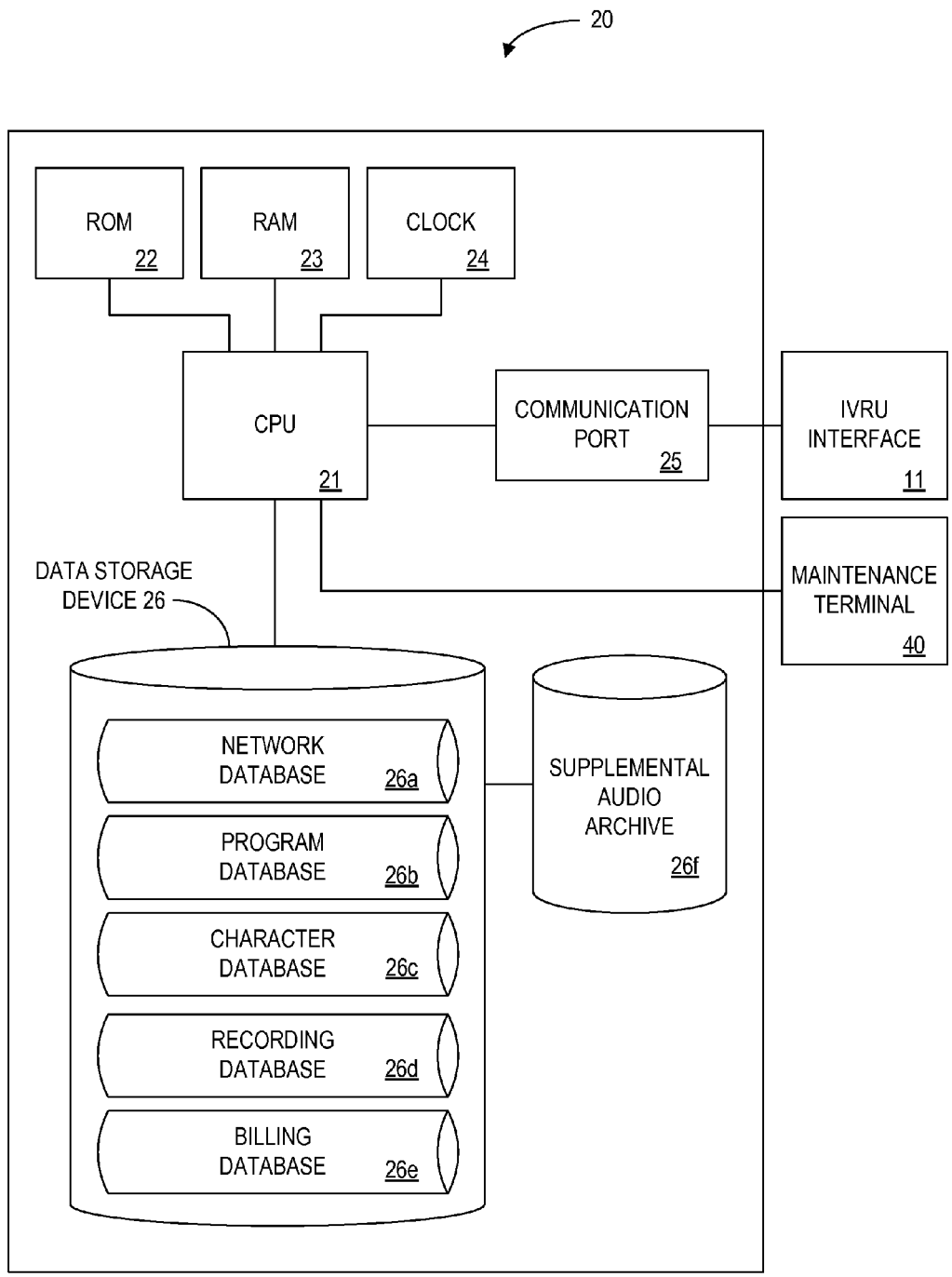
FIG. 2 is a block diagram of the service controller of FIG. 1.

FIG. 2 is a block diagram of the preferred service controller 20. The service controller 20 includes a CPU 21 which performs the processing functions. The service controller 20 also includes a read only memory 22 (ROM) and a random access memory 23 (RAM). The ROM 22 is used to store at least some of the program instructions that are to be executed by the CPU 21, such as portions of the operating system or basic input-output system (BIOS), and the RAM 23 is used for temporary storage of data. A clock circuit 24 provides a clock signal which is required by the CPU 21.

The CPU 21 can also store information to, and read information from, a data storage device 26. The data storage device 26 includes a network database 26a, a program database 26b, a character database 26c, a recording database 26d, and a billing database 26e. These databases are described below. In addition, the data storage device 26 includes instructions which can be read by and executed by the CPU 21, thereby enabling the CPU 21 to process requests. While FIG. 2 depicts separate databases, a single database that incorporates the functions of the databases mentioned above can also be used. Additional databases may be added as needed to store a variety of other information that may be required for other purposes.

The data storage device 26 also contains all the supplemental audio information recorded for each character, the supplemental audio archive 26f as described in more detail subsequently. Any of a wide variety of storage mediums are suitable for this purpose, including, for example, audio cassettes, digital audio tapes (DAT), laser discs, and the like.

In an alternative embodiment, the service controller 20 may have an external interface for inputting supplemental information, either live or pre-recorded. This supplemental information may include, for example, live audio information or even video information coupled with an audio component. The live audio information can include, for example, alternative color commentary for sporting events (e.g., Howard Stern, a popular radio disc jockey, providing supplemental color commentary on the Super Bowl), or even specific athletes wearing microphones/transmitters during the sporting contest (e.g., a customer could dial 1-900-RANGERS to hear what their favorite hockey player is saying during the game).

The service controller 20 also includes a communication port 25 connected to an inter-active voice response unit interface 11. The communication port 25 enables the CPU 21 to communicate with external devices. An IVRU 12, as shown in FIG. 1, is linked to the service controller 20 via the IVRU interface 11. The IVRU 12 is connected to the PSTN 10.

A plurality of telephone trunks (not shown) terminate at the IVRU 12 to allow multiple callers (i.e., customers) to call the IVRU 12 simultaneously. These telephone trunks may be analog or digital. The IVRU 12 may also terminate North American standard digital signal one (1.544 Mb/sec) facilities in a manner similar to a private-branch exchange (PBX).

The IVRU 12 allows the customer to communicate with the service controller 20 using his or her telephone (not shown). Voice command prompts guide the customer through various menu options allowing the customer to communicate and obtain information from the service controller 20.

Figure 3:
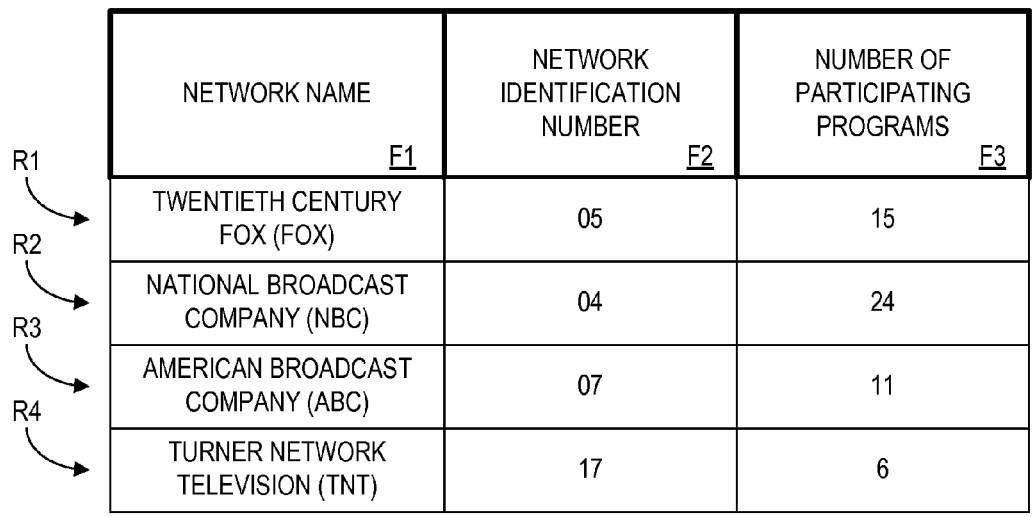
FIG. 3 is a table depicting the network database within the service controller of FIG. 2.

FIG. 3 is a pictorial representation depicting the information stored in the network database 26a. The network database 26a comprises information related to each TV program provider or distributor associated with the present invention. The network database 26a includes a network name field F1, a network identification number field F2, and a number of participating programs field F3. The network identification number field F2 is a unique two digit code corresponding to each network or TV program provider. While only four records R1-R4 for four networks are depicted in FIG. 3, any number of records may be stored. It is also understood that independent and syndicated broadcast program providers may also be included in this database.

FIG. 4 is a pictorial representation of the content of the program database 26b. The program database 26b comprises information related to each television program 30 for which supplemental information is available. The program database 26b includes a program name field F4, a program identification number field F5, a network identification number field F6 (corresponding to field F2 of the network database 26a), a broadcast times field F7, a participating characters field F8, and a phone number field F9. The program identification number field F5 is a unique four digit code corresponding to each TV program. The participating characters field F8 contains the names of various characters for which supplemental audio information is available. The phone number field F9 includes a unique telephone number associated with each television program 30. This unique telephone number is dialed by the customer to request supplemental audio information related to that particular television program 30. Other fields are described in greater detail below. Any number of records R5 may be stored in this database.

FIG. 5 is a pictorial representation of the layout and the information stored in the character database 26c. The character database 26c comprises information related to specific characters for which supplemental audio information is available. The character database 26c includes a character name field F10, a character number field F11, and a program identification number field F12 (corresponding to field F5 in database 26b). While only four records R6-R9 for four characters are depicted in FIG. 5, any number of records may be stored.

Figure 6:
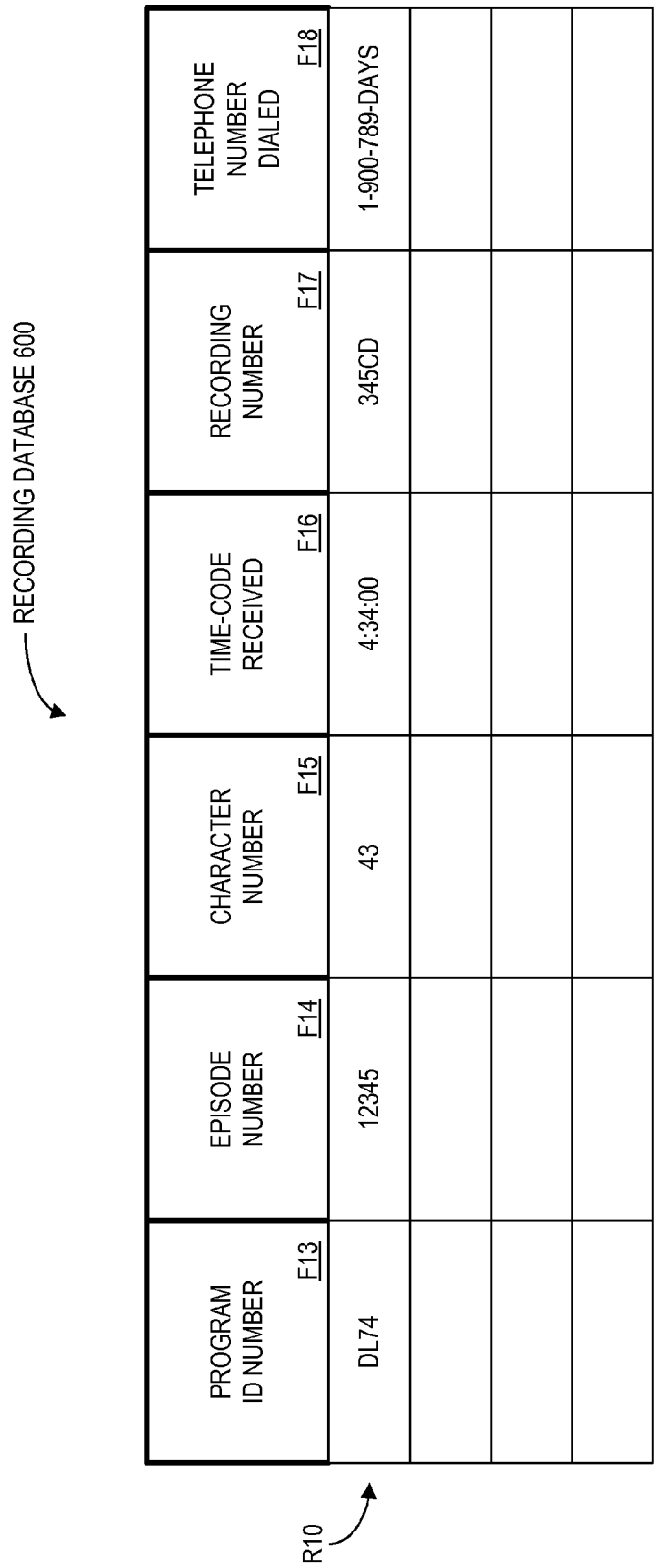
FIG. 6 is a table depicting the recording database within the service controller of FIG. 2.

FIG. 6 is a pictorial representation of the layout of the recording database 26d. The recording database 26d comprises information related to the supplemental audio information which may be provided to a particular customer. The recording database 26d includes a program identification number field F13 (corresponding to field F5 in the program database 26b), an episode number field F14, a character number field F15 (corresponding to field F11 in the character database 26c), a time-code received field F16, a recording number field F17, and a telephone number dialed field F18. The time-code received field F16 is discussed in more detail below. Any number of records R10 may be stored in this database.

FIG. 7 is a pictorial representation of the layout and the information stored in the billing database 26e. The billing database 26e includes a caller telephone number field F19, a 900 number dialed field F20, a program identification number field F21 (corresponding to field F5 in the program database 26b), a character number field F22 (corresponding to field F11 in the character database 26c), a recording number field F23 (corresponding to field F17 in the recording database 26d), a total time expired field F24, a final dollar amount F25, and a caller verified rate field F26. While only four records R11-R14 are depicted in FIG. 7, any number of records may be stored. To conserve storage space on the data storage device 26, records may be transferred to a different storage device or deleted after some predetermined time interval or after a predetermined event such as receipt of payment from the customer.

It is understood that the records and information stored within all the databases may be updated as needed, for example, when a new character is added or a show is deleted from the databases. This is accomplished through a maintenance terminal 40 operatively connected to the service controller 20.

Figure 8:
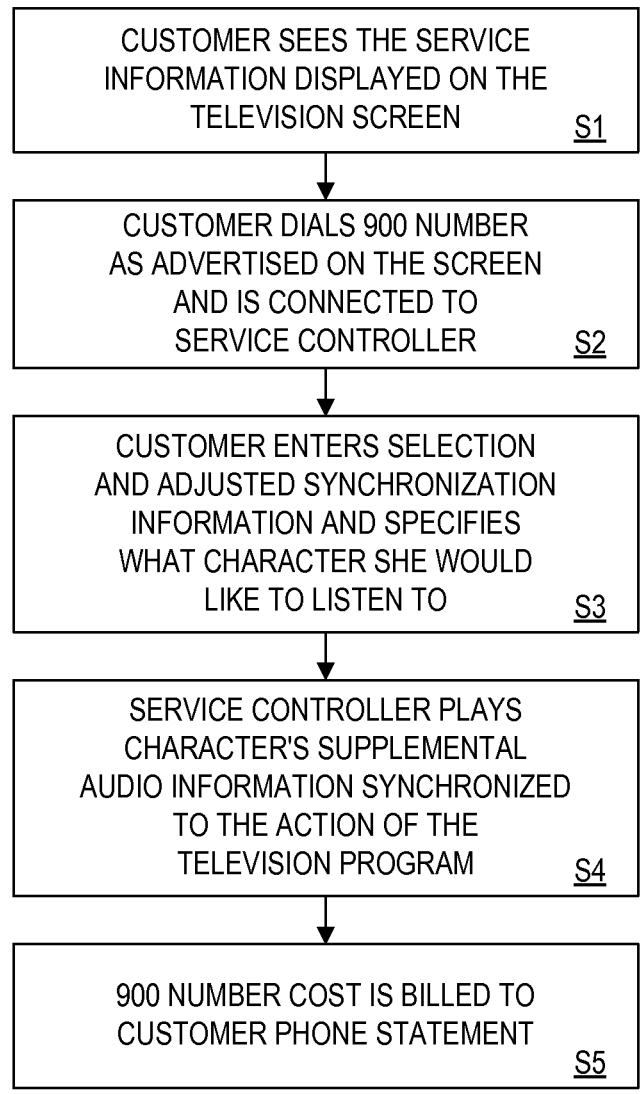
FIG. 8 is a flow chart of the operation of the system.

FIG. 8 is a flow chart depicting an exemplary operation of the preferred embodiment of the present invention from the point of view of a customer. The process starts when the customer sees the service information 31 displayed on a TV screen while viewing the television program 30 in step S1.

As mentioned above, the service information 31 comprises three components: a 900 telephone number, selection information and synchronization information, as described in detail below. In this embodiment, one general 900 telephone number is provided for all the TV programs, and the selection information, is used to select particular supplemental information for the television program 30.

The synchronization information comprises a running time-code that is updated on the TV screen at predetermined intervals. The preferred interval for updating the time-code is every second. However, other intervals can also be used, for example, the time-code could be updated at specific milestones during the television program 30.

The time-code ensures that the supplemental audio information is properly synchronized to the TV program 30. It also allows the supplemental audio information to be synchronized to a TV program that has been taped using a video cassette recorder (VCR). Thus, the customer may listen to supplemental audio information for a TV program while it is being broadcast, or during a time-shifted playback of a previously broadcast TV program.

An example of the time-code in the preferred embodiment is the number "3600." In this case, the time-code indicates that the supplemental audio information should be offset by sixty minutes and zero seconds (i.e., 3600 seconds, which is exactly sixty minutes). Of course, time-codes greater than four digits can also be used if greater offsets are required.

As understood by one of ordinary skill in the art of telephony, 900 telephone numbers provide services (e.g. weather or sports information) for which the caller is charged a predetermined rate per minute of use. In a similar manner, the customer is charged for supplemental audio information provided.

In an alternative embodiment, a unique 900 telephone number for each television program 30 may be used, instead of one general 900 telephone number. In such an embodiment, the service controller 20 determines which television program 30 is being viewed by the customer based on the unique 900 telephone number dialed. In another embodiment, 800 or 888 numbers may also be used. In such an embodiment, the customer is prompted for a credit card number to pay for the supplemental audio information. Arrangements could also be made for pre-paid minutes or service credits for particular customers.

By utilizing his or her telephone, the customer communicates to the service controller 20 by making a conventional telephone call. In step S2, the customer dials the 900 telephone number, which is provided as part of the service information 31, and is connected to the service controller 20. After the connection is made, the customer is prompted via recorded voice messages to enter selection information and synchronization information related to the program being viewed. The telephone's keypad is used to enter this information. Alternatively, voice recognition software within the IVRU 12 could also be used to respond to voice commands from the customer.

After entering the synchronization information consisting of the time-code, the customer can optionally adjust the entered time-code to ensure a close match with the running time-code on the television program 30. In particular, recorded messages transmitted from the IVRU 12 can prompt the customer to adjust the time-code using the telephone keypad. For example, the "pound" key can be used to increment the value of the time-code, and the "star" key to decrement the value of the time-code.

The customer then listens to a menu listing of characters. In step S3, the customer selects which character (or group of characters) in the television program 30 for which he or she desires to receive supplemental audio information. Optionally, the customer may be provided with additional menu choices such as the option of purchasing supplemental audio information for the entire television program 30 or just a portion.

In step S4, the service controller 20 plays the selected supplemental audio information synchronized to the action occurring on the television program 30. The supplemental audio information is synchronized so that it does not overlap with the spoken dialogue of the television program 30, but supplements it during appropriate pauses or gaps. The customer receives the supplemental audio information via the telephone. Of course, the customer can use a speaker phone or other speaker means to facilitate listening to the supplemental audio information.

In an alternative embodiment, an interface via the Internet may also be provided allowing the customer to receive the supplemental audio information, as well as make the request for the supplemental audio information. This Internet interface may also be used to receive supplemental video or text information from the service controller 20 related to the particular television program 30 selected by the customer. For example, the text of a note handed between two characters on a TV program 30 could be displayed on a commercially available web browser running on a computer connected to the Internet.

The service charges are billed to the customer's periodic telephone statement in step S5. In the customer's periodic telephone statement, an itemized listing of the charges appear for each supplemental audio information received. Of course, the customer may be billed in other ways, such as a separate statement for each use. Alternatively, instead of a 900 telephone number, an 800 or 888 telephone number may be provided through which the customer would also be prompted to enter a valid credit card number to be billed for the service.

Figure 9A:
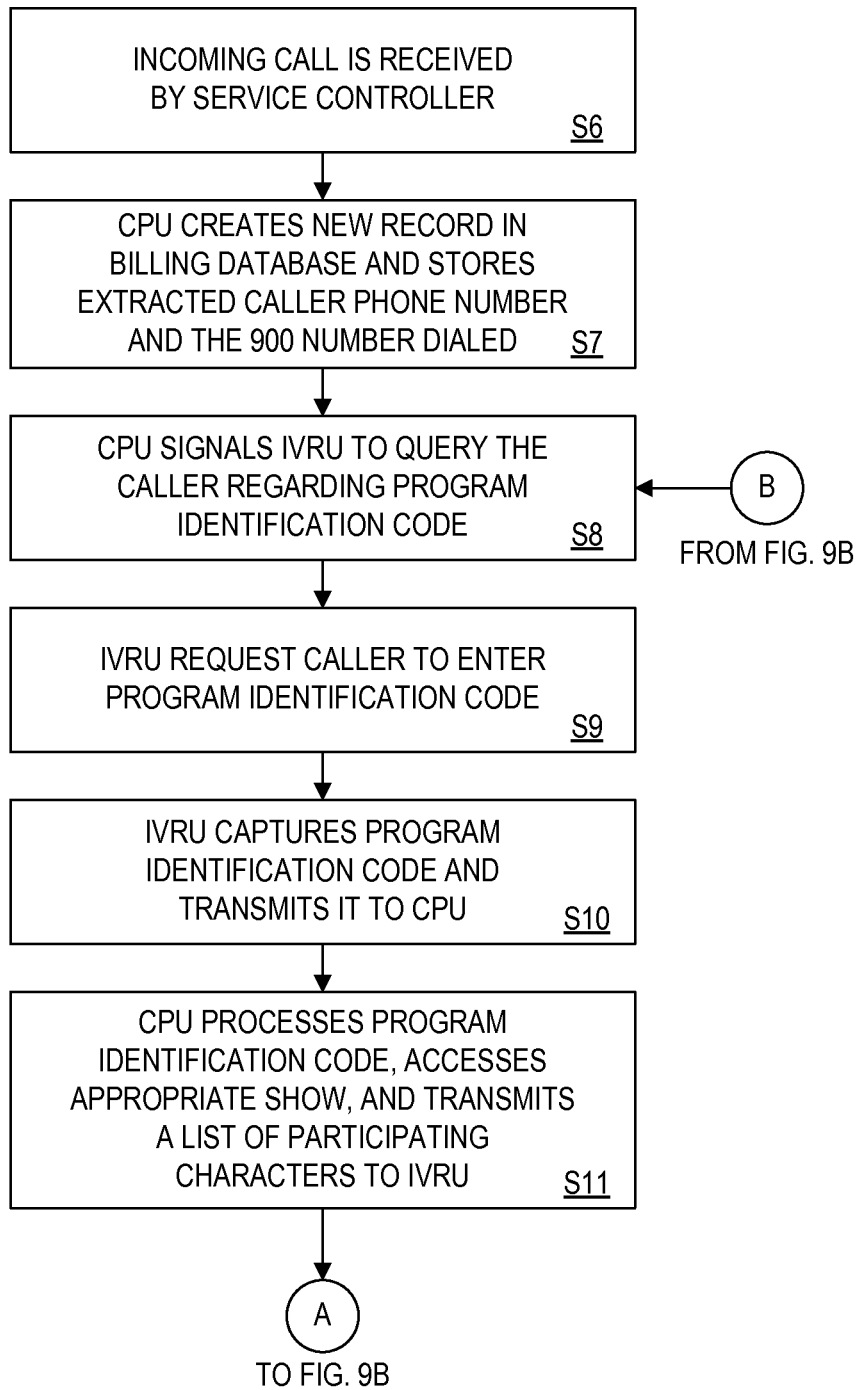
FIGS. 9a and 9b are flow charts of the operation of the service controller.
Figure 9B:
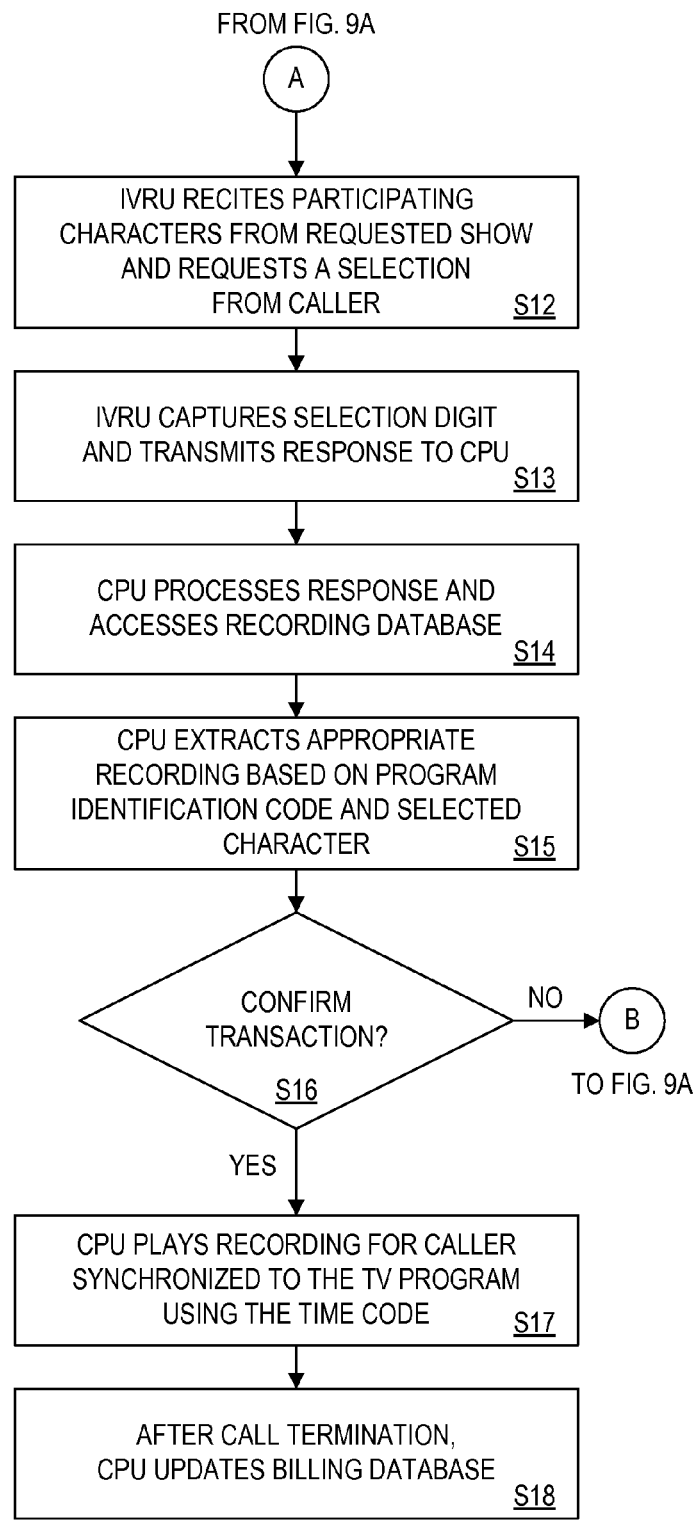

FIGS. 9a and 9b are flow charts of the exemplary operation of the service controller 20 after the customer dials the 900 telephone number and is connected to the service controller 20 via the PSTN 10. The steps of the process shown in FIGS. 9a and 9b may be implemented in a computer program that may be installed at the service controller 20 from a computer readable medium and then stored therein in one or more of the ROM 22, the RAM 23 and the data storage device 26 (shown in FIG. 2).

After the incoming call has been received by the service controller 20 in step S6, the CPU 21 creates in step S7 a new record in the billing database 26e (shown in FIG. 2). Stored in the appropriate fields (F19 and F20, respectively in FIG. 7) in this new record are the caller's telephone number and the 900 telephone number dialed by the caller. As understood by one of ordinary skill in the art of telephony, the caller's telephone number is received from a telephone switch that established the connection through the PSTN 10.

In steps S8-S10, the CPU 21 requests and receives the program identification code from the caller via the IVRU 12. The program identification code is processed, as discussed in detail below, by the service controller 20 in step S11. Also in step S11, the CPU 21 accesses the program database 26b and retrieves the list of participating characters for the particular television program 30. The list is then transmitted to the IVRU 12.

In step 12, the caller (i.e. the customer) receives a recorded voice message from the IVRU 12 comprising a menu of the participating characters to choose from. The caller's character selection is captured and transmitted to the CPU 21 by the IVRU 12 in step S13. This information is processed by the service controller 20 which then accesses the recording database 26d.

The recording database 26d contains identifying information for all the supplemental audio information stored within the data storage device 26 or accessible by the CPU 21. Based on the program identification code and character selection entered by the caller, the CPU 21 in step S15 obtains the appropriate supplemental audio information stored in the data storage device 26 or accessible by the CPU 21.

Before the supplemental audio information is communicated, the caller is prompted to confirm the transaction in step S16. This includes confirming the supplemental audio information selected by the caller as well as billing information. If the caller decides not to complete the transaction, he or she can simply hang up the telephone or start the process over to select different supplemental audio information.

After confirmation, the CPU 21 in step S17 communicates the supplemental audio information, which is synchronized to the action occurring on the television program 30 using the time-code entered by the caller. This is accomplished, as described above, by starting the supplemental information using the time-code as an offset. The CPU 21 starts playback of the supplemental audio information accordingly, based on the entered time-code.

After the call termination (i.e. the supplemental audio information is complete or the caller hangs up the telephone), the CPU 21 in step S18 updates the caller's record in the billing database 26. This record is used to track the cost of the call. The actual billing is done by the phone company, who, upon receipt of payment from the caller, reimburses the service for the cost of the content. The service charge information is sent to the caller's telephone service provider and appears on the caller's monthly or periodic telephone statement. Of course, alternate methods of payment may be used instead, including credit card transactions, debit cards, or the caller could receive a separate bill for each use and pay by check or similar means. In these cases, the billing database would be used to actually bill the customer and/or interact with a credit card company.

The revenues generated by the service can be distributed in a variety of ways among the various persons and organizations providing the service (i.e. the TV program provider, the 900 service provider, the actors, etc.).

Figure 10A:
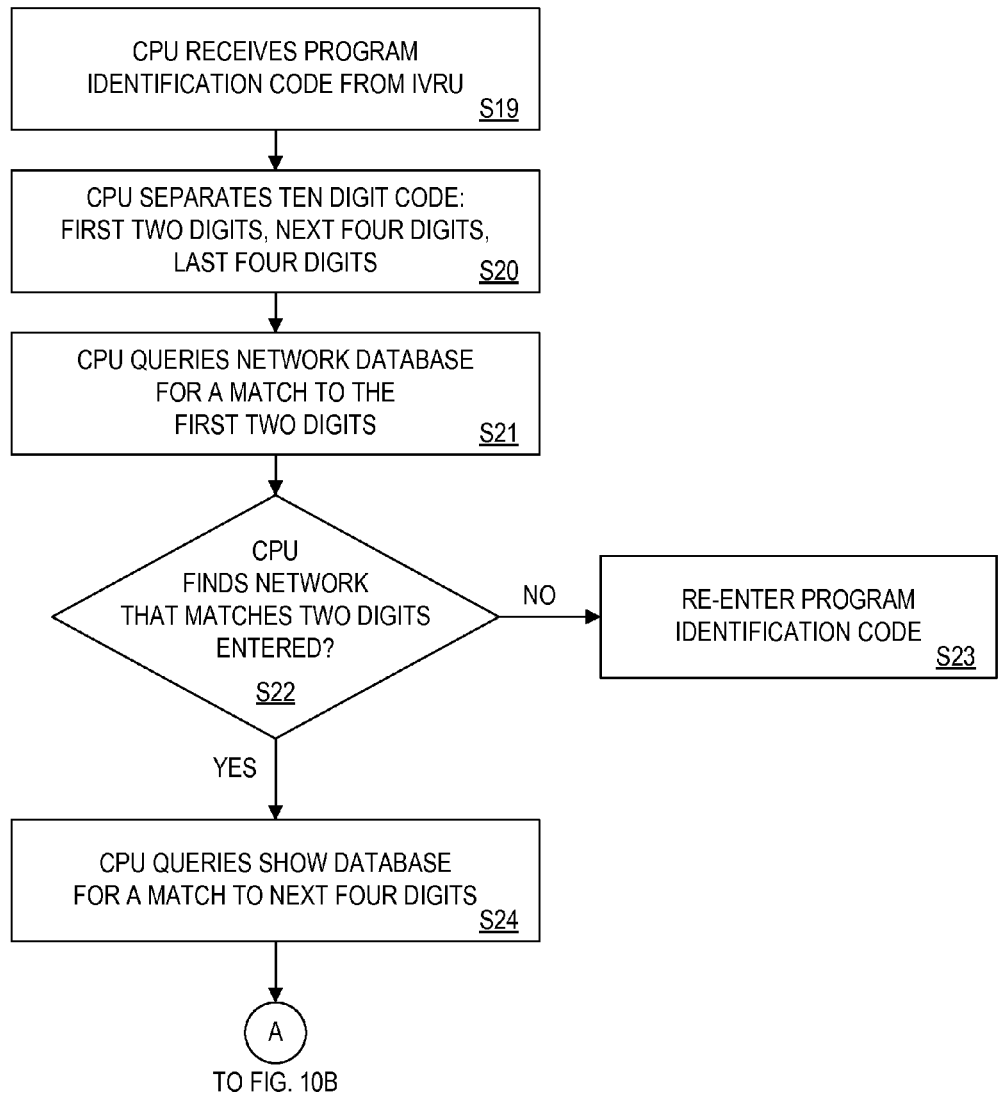
FIGS. 10a and 10b are flow charts depicting how the service controller processes information received from the IVRU.
Figure 10B:
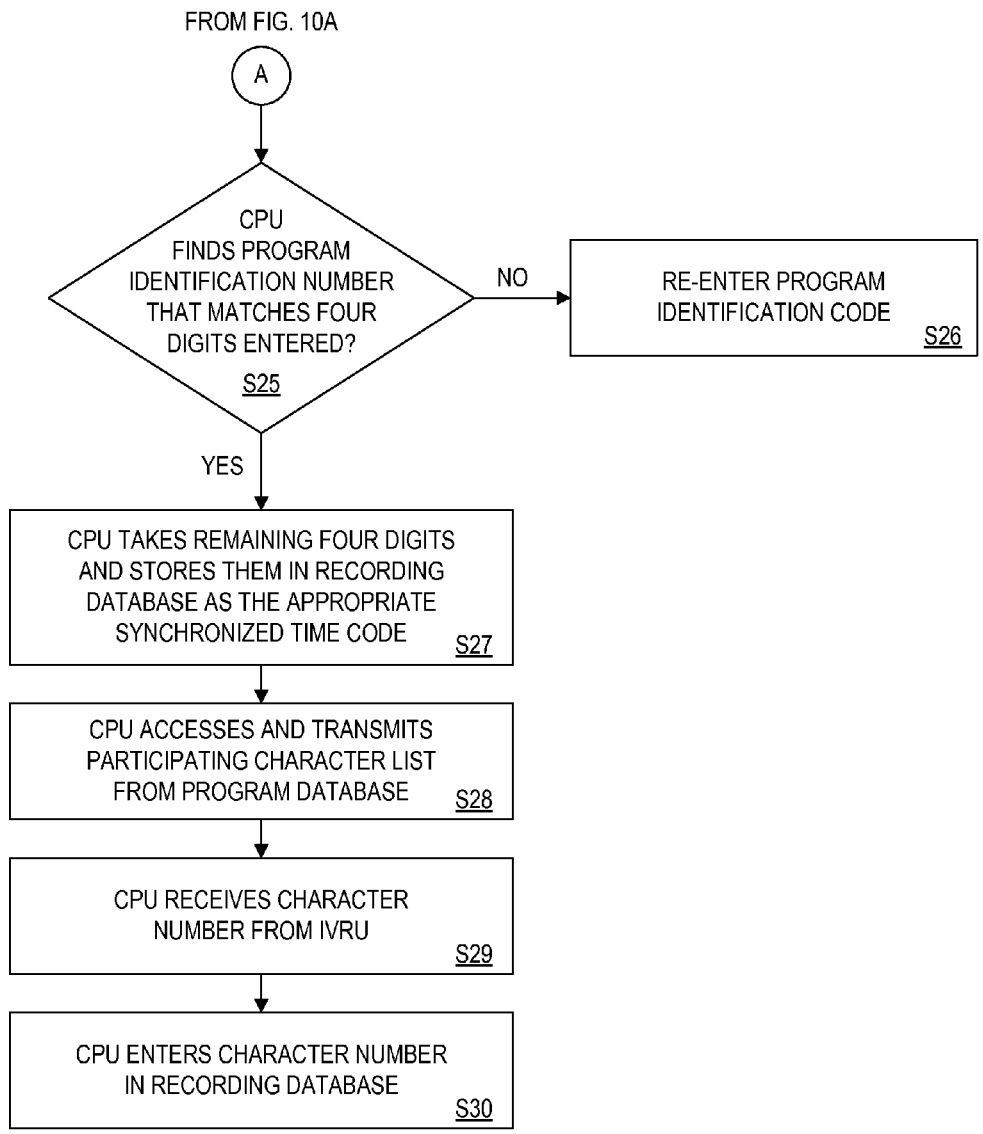

FIGS. 10a and 10b are flow charts depicting how the service controller processes information received from the IVRU 12. In step S19, the CPU 21 receives the ten digit alphanumeric string from the IVRU 12. These ten digits represent the program identification code which is entered by the customer via his or her telephone, as discussed above.

In step S20, the CPU 21 separates the ten digit string as follows: the first two digits, the next four digits, and the last four digits. As described below, the separated strings represent program selection information and synchronization information related to the broadcast television program 30.

The first two digits represent the network identification number for the television program 30. In step S21, the CPU 21 searches for a match in the network identification number field F2 of the network database 26a. If no match is found in step S22, the CPU 21 prompts the customer via the IVRU 12 to reenter the program identification code in step S23. Otherwise, the CPU 21 continues to step S24.

The next four digits of the program identification code represent the program identification number. In step S24, the CPU 21 searches for a match in the program identification number field F5 of the program database 26b. If no match is found in step S25, the CPU 21 prompts the customer via the IVRU 12 to reenter the program identification code in step S26. Otherwise, the CPU 21 continues to step S27.

Alternatively, the program identification code can have more than ten digits. This would allow additional information to be entered by the caller, for example, an episode number. The last four digits of the program identification code represent the synchronization information (i.e the time-code).

In step S27, the CPU 21 stores the time-code in a new record created for the customer in the recording database 26d. Once the time-code has been received (and adjusted), the CPU updates the time-code at the predetermined intervals to ensure proper synchronization with the television program 30 is maintained. Other information including the program identification number and the number dialed by the caller are also stored in the new record.

In an alternative embodiment, the synchronization information may be derived by the service controller 20 directly from the television program 30. The user, for example, could hold the telephone up to the speaker of the television so that the service controller 20 could receive the synchronization information. The service controller 20 would monitor the audio component of the television program 30 and compare it with the corresponding audio track (i.e. a duplicate) stored at the service controller 20. Using the stored copy, the service controller 20 would synchronize the supplemental audio information without requiring the customer to enter any additional information.

The CPU 21 accesses the participating characters field F8 in the program database 26b and transmits the list to the caller via the IVRU 12 in step S28. The CPU 21 receives from the caller via the IVRU 12 the character selection number in step S29. Once again, the caller enters this information using his or her telephone keypad. The character selection number is a two digit alphanumeric string. The CPU 21 receives it and enters it in the appropriate field in the recording database 26d in step S30.

In an alternative embodiment, the supplemental audio information may be used to offer services such as foreign language translations of TV programs and descriptive audio for the blind.

While the present invention has been described above in terms of specific embodiments, it is to be understood that the invention is not intended to be confined or limited to the embodiments disclosed herein. On the contrary, the present invention is intended to cover various methods, structures and modifications thereof included within the spirit and scope of the appended claims.

What is claimed is:

1. A method of providing supplemental information, comprising:
   receiving, via a network, by a service controller device and from a first user device, a request for information supplemental to video being displayed by a second user device, the video not being output by the first user device and the request comprising an indication of synchronization information associated with the video being displayed by the second user device;
   determining, by the service controller device and based at least in part on the synchronization information, the information supplemental to the video being displayed by the second user device; and
   providing, by the service controller device and to the first user device, the information supplemental to the video being displayed by the second user device.

2. The method of claim 1, wherein the receiving of the request, comprises:
   receiving, via the network and by the service controller device, an indication of a wireless transmission of the synchronization information.

3. The method of claim 1, wherein the synchronization information comprises a time code and wherein the information supplemental to the video being displayed by the second user device is not provided to the second user device.

4. The method of claim 1, wherein the request further comprises an indication of a desired type of supplemental information, and wherein the determining of the information supplemental to the video being displayed by the second user device is further based at least in part on the indication of the desired type of supplemental information.

5. The method of claim 1, wherein the determining of the information supplemental to the video being displayed by the second user device, comprises:
   determining a plurality of available supplemental information associated with the video being displayed by the second user device; and
   selecting, from the plurality of available supplemental information and based at least in part on the synchronization information, a sub-set of the plurality of available supplemental information.

6. The method of claim 1, wherein the providing of the information supplemental to the video being displayed by the second user device, comprises:
   providing, via the Internet, an interface via which the information supplemental to the video being displayed by the second user device may be accessed.

7. The method of claim 1, wherein the providing of the information supplemental to the video being displayed by the second user device, comprises:
   transmitting, via the network, by the service controller device and to the first user device, the information supplemental to the video being displayed by the second user device.

8. The method of claim 1, wherein the supplemental information comprises supplemental video.

9. The method of claim 1, wherein the supplemental information comprises supplemental audio.

10. The method of claim 1, wherein the supplemental information comprises supplemental text.

11. The method of claim 1, wherein the video being displayed by the second user device comprises a broadcast video.

12. The method of claim 1, wherein the video being displayed by the second user device comprises a recorded video.

13. The method of claim 1, wherein the first user device comprises a telephone device.

14. The method of claim 1, wherein the second user device comprises a television coupled to a time-shifted video playback device.

15. A service controller apparatus, comprising:
   a processor; and
   a memory in communication with the processor, the memory storing instructions that when executed by the processor result in:
   receiving, via a network and from a first user device, a request for information supplemental to video being output by a second user device, the video not being output by the first user device and the request comprising an indication of synchronization information associated with the video being output by the second user device;
   determining, based at least in part on the synchronization information, the information supplemental to the video being output by the second user device; and
   providing, to the first user device, the information supplemental to the video being output by the second user device.

16. A non-transitory computer readable medium storing instructions that when executed by a processing device result in:
   receiving, via a network and from a first user device, a request for information supplemental to video being output by a second user device, the video not being output by the first user device and the request comprising an indication of synchronization information associated with the video being output by the second user device;
   determining, based at least in part on the synchronization information, the information supplemental to the video being output by the second user device; and
   providing, to the first user device, the information supplemental to the video being output by the second user device.

17. A method for requesting supplemental information comprising:
   transmitting, via a network, by a first user device and to a service controller device, a request for information supplemental to video being output by a second user device, the video not being output by the first user device and the request comprising an indication of synchronization information associated with the video being output by the second user device;

receiving, by the first user device and from the service controller device and in response to the transmitting of the request, the information supplemental to the video being output by the second user device, the information supplemental to the video being output by the second user device being based at least in part on the synchronization information; and outputting, by the first user device and to a user of the first user device, the information supplemental to the video being output by the second user device.

18. The method of claim 17, further comprising:
receiving, prior to the transmitting, by the first user device and from the second user device, an indication of the synchronization information.

19. The method of claim 18, wherein the receiving, comprises:
receiving, by the first user device and from the second user device, a wireless transmission of data indicative of the synchronization information.

20. The method of claim 17, wherein the synchronization information comprises a time code.

21. The method of claim 17, wherein the request further comprises an indication of a desired type of supplemental information, and wherein the information supplemental to the video being output by the second user device is further based at least in part on the indication of the desired type of supplemental information.

22. The method of claim 17, wherein the receiving of the information supplemental to the video being output by the second user device, comprises:
receiving, via the network, by the first user device and from the service controller device, a transmission indicative of the information supplemental to the video being output by the second user device.

23. The method of claim 17, wherein the receiving of the information supplemental to the video being output by the second user device, comprises:
receiving, via an Internet interface, access to the information supplemental to the video being output by the second user device.

24. The method of claim 17, wherein the outputting of the information supplemental to the video being output by the second user device, comprises:
outputting, via an Internet interface, the information supplemental to the video being output by the second user device.

25. The method of claim 17, wherein the supplemental information comprises supplemental video.

26. The method of claim 17, wherein the supplemental information comprises supplemental audio.

27. The method of claim 17, wherein the supplemental information comprises supplemental text.

28. The method of claim 17, wherein the video being output by the second user device comprises a recorded video.

29. The method of claim 17, wherein the first user device comprises a telephone device.

30. The method of claim 17, wherein the second user device comprises a time-shifted video playback device.

* * * * *